(12) United States Patent
Novak et al.

(10) Patent No.: US 9,072,106 B2
(45) Date of Patent: *Jun. 30, 2015

(54) DEVICE-EMPOWERED RADIO RESOURCE SELECTION

(75) Inventors: Robert Novak, Stittsville (CA); William Gage, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/696,218

(22) PCT Filed: Mar. 24, 2011

(86) PCT No.: PCT/CA2011/050153
§ 371 (c)(1),
(2), (4) Date: Nov. 5, 2012

(87) PCT Pub. No.: WO2012/126080
PCT Pub. Date: Sep. 27, 2012

(65) Prior Publication Data
US 2014/0024386 A1 Jan. 23, 2014

(51) Int. Cl.
*H04W 4/00* (2009.01)
*H04W 72/08* (2009.01)
(Continued)

(52) U.S. Cl.
CPC ............ *H04W 72/082* (2013.01); *H04W 72/02* (2013.01); *H04W 72/04* (2013.01);
(Continued)

(58) Field of Classification Search
CPC ... H04W 72/00; H04W 52/00; H04W 84/045; H04W 72/082; H04W 92/20; H04W 72/04; H04W 72/1226; H04W 72/1231; H04W 72/085; H04W 28/26; H04W 72/0413; H04W 72/042; H04W 72/046; H04L 5/0073; H04L 5/0032
USPC ............ 455/450, 452.1, 451, 452.2, 62, 63.1, 455/63.2, 67.13, 501, 502, 509, 524, 525; 370/328, 252, 329, 330, 338, 341
IPC .............. H04W 72/082, 92/20, 72/04, 72/1226, H04W 72/1231, 72/085, 28/26, 72/046; H04L 5/0073, 5/0032
See application file for complete search history.

(56) References Cited

U.S. PATENT DOCUMENTS 6,950,656 B1   9/2005   Bahk et al.
8,717,987 B2 *  5/2014   Das et al. ...................... 370/329
(Continued)

FOREIGN PATENT DOCUMENTS

WO   2009143382 A2   11/2009
WO   2010040098 A2    4/2010
(Continued)

OTHER PUBLICATIONS

International Search Report and Written Opinion for International Application No. PCT/CA2011/050152 issued on Dec. 19, 2011; 11 pages.

(Continued)

*Primary Examiner* — Olumide T Ajibade Akonai
(74) *Attorney, Agent, or Firm* — Conley Rose, P.C.; J. Robert Brown, Jr.

(57) ABSTRACT

A system and method are provided for mitigating interference between wireless access points (APs). A user equipment (UE) device uses a first set of radio resources to wirelessly communicate with a first AP and a second set of radio resources to wirelessly communicate with a second AP. The UE device then uses the first and second radio resources to communicate cooperation data between the first and second access points to mitigate interference therebetween.

14 Claims, 7 Drawing Sheets

(51) Int. Cl.
*H04W 72/02* (2009.01)
*H04W 72/04* (2009.01)
*H04L 5/00* (2006.01)
*H04W 72/12* (2009.01)
*H04W 88/06* (2009.01)

(52) U.S. Cl.
CPC ........... *H04W 72/085* (2013.01); *H04L 5/0073* (2013.01); *H04W 72/0413* (2013.01); *H04W 72/1215* (2013.01); *H04W 88/06* (2013.01)

(56) References Cited

U.S. PATENT DOCUMENTS

| | | | |
|---|---|---|---|
| 8,731,576 B2* | 5/2014 | Hamabe et al. | 455/452.2 |
| 2007/0263702 A1 | 11/2007 | Kwon et al. | |
| 2008/0056201 A1 | 3/2008 | Bennett | |
| 2008/0159234 A1* | 7/2008 | Prakash et al. | 370/332 |
| 2008/0259883 A1 | 10/2008 | Mishra et al. | |
| 2008/0267126 A1* | 10/2008 | Vujcic et al. | 370/330 |
| 2009/0022093 A1 | 1/2009 | Nabar et al. | |
| 2009/0196174 A1* | 8/2009 | Ji | 370/230.1 |
| 2009/0197588 A1 | 8/2009 | Khandekar et al. | |
| 2009/0197603 A1* | 8/2009 | Ji et al. | 455/436 |
| 2009/0290550 A1* | 11/2009 | Bhattad et al. | 370/329 |
| 2009/0291640 A1 | 11/2009 | Bhattad et al. | |
| 2010/0008244 A1 | 1/2010 | Sampath et al. | |
| 2010/0008282 A1* | 1/2010 | Bhattad et al. | 370/312 |
| 2010/0029282 A1 | 2/2010 | Stamoulis et al. | |
| 2010/0039983 A1 | 2/2010 | Yee et al. | |
| 2010/0046457 A1 | 2/2010 | Abraham et al. | |
| 2010/0087149 A1 | 4/2010 | Srinivasan et al. | |
| 2010/0107028 A1 | 4/2010 | Gorokhov et al. | |
| 2010/0159936 A1 | 6/2010 | Brisebois et al. | |
| 2010/0172310 A1* | 7/2010 | Cheng et al. | 370/329 |
| 2010/0208662 A1 | 8/2010 | Vilella et al. | |
| 2010/0296405 A1 | 11/2010 | Madan et al. | |
| 2010/0311434 A1* | 12/2010 | Du et al. | 455/452.2 |
| 2011/0149764 A1* | 6/2011 | Wietfeldt et al. | 370/252 |
| 2011/0201340 A1* | 8/2011 | Lunden et al. | 455/447 |
| 2011/0287794 A1* | 11/2011 | Koskela et al. | 455/509 |
| 2012/0058794 A1* | 3/2012 | Valentine | 455/513 |
| 2012/0077508 A1* | 3/2012 | Khan et al. | 455/450 |

FOREIGN PATENT DOCUMENTS

| | | | |
|---|---|---|---|
| WO | 2010050718 A2 | 5/2010 | |
| WO | 2010093644 A1 | 8/2010 | |
| WO | 2010124725 A1 | 11/2010 | |
| WO | 2011020062 A2 | 2/2011 | |

OTHER PUBLICATIONS

International Search Report and Written Opinion for International Application No. PCT/CA2011/050153 issued Sep. 15, 2011; 8 pages.
International Search Report and Written Opinion for International Application No. PCT/CA2011/050154 issued on Dec. 20, 2011; 11 pages.
The International Search Report and Written Opinion for International Application No. PCT/CA2011/050155 issued Oct. 24, 2011; 8 pages.
European Search Report and Written Opinion for International Application No. PCT/CA2011/050152 issued on Sep. 2, 2014; 6 pages.
European Search Report and Written Opinion for International Application No. PCT/CA2011/050153 issued on Aug. 7, 2014; 9 pages.
European Search Report and Written Opinion for International Application No. PCT/CA2011/050154 issued on Sep. 5, 2014; 6 pages.
Huawei, et al.: "Considerations on HSDPA Multi-point Transmission", 3GPP TSG RAN WG1 Meeting #63bis Dublin, Ireland; Jan. 13, 2011; pp. 4.
Novak, Robert, et al.; U.S. Appl. No. 13/696,208, filed Nov. 5, 2012; Title: Device-Empowered Radio Resource Management.
Novak, Robert, et al.; U.S. Appl. No. 13/696,224, filed Nov. 5, 2012; Title: Device-Empowered Radio Resource Management.
Novak, Robert, et al.; U.S. Appl. No. 13/696,231, filed Nov. 5, 2012; Title: Device-Empowered Radio Resource Management.
Office Action dated Apr. 24, 2014; U.S. Application No. 13/696,208, filed Nov. 5, 2012; 30 pages.
Final Office Action dated Sep. 24, 2014; U.S. Appl. No. 13/696,208, filed Nov. 5, 2012; 19 pages.
Advisory Action dated Dec. 12, 2014; U.S. Appl. No. 13/696,208, filed Nov. 5, 2012; 3 pages.
Advisory Action dated Feb. 12, 2015; U.S. Appl. No. 13/696,208, filed Nov. 5, 2012; 4 pages.
Office Action dated Oct. 17, 2014; U.S. Appl. No. 13/696,224, filed Nov. 5, 2012; 17 pages.
Notice of Allowance dated Feb. 3, 2015; U.S. Appl. No. 13/696,224, filed Nov. 5, 2012; 17 pages.
Office Action dated Apr. 25, 2014; U.S. Appl. No. 13/696,231, filed Nov. 5, 2012; 33 pages.
Final Office Action dated Oct. 17, 2014; U.S. Appl. No. 13/696,231, filed Nov. 5, 2012; 22 pages.
Advisory Action dated Jan. 27, 2015; U.S. Appl. No. 13/696,231, filed Nov. 5, 2012; 3 pages.

* cited by examiner

DEVICE-EMPOWERED RADIO RESOURCE SELECTION

PRIORITY

This is a U.S. national stage of application No.: PCT/CA2011/050153, filed on Mar. 24, 2011. All the benefits accruing therefrom under 35 U.S.C §119, the contents of which in its entirety are herein incorporated by reference.

CROSS REFERENCE TO RELATED APPLICATIONS

Patent application Ser. No. PCT/CA2011/050152, entitled DEVICE-EMPOWERED RADIO RESOURCE MANAGEMENT, by inventors Robert Novak and William Gage, filed on even date herewith, describes exemplary methods and systems and is incorporated by reference in its entirety.

Patent application Ser. No. PCT/CA2011/050154, entitled DEVICE-EMPOWERED RADIO RESOURCE ASSIGNMENT, by inventors Robert Novak and William Gage, filed on even date herewith, describes exemplary methods and systems and is incorporated by reference in its entirety.

Patent Application No. PCT/CA2011/050155, entitled DEVICE-EMPOWERED RADIO RESOURCE SYSTEM, by inventors Robert Novak and William Gage, filed on even date herewith, describes exemplary methods and systems and is incorporated by reference in its entirety.

BACKGROUND

The realization of greater wireless capacity in today's communications environments may require the achievement of a consistently higher signal to interference-plus-noise ratio (SINR) over a significant percentage of a cell's coverage area. Yet achievement of such a goal will require, in general, smaller cells or alternatively, operation in a smaller region of a cell when operating at a given transmission power level. Hence, the current network model of higher-power outdoor macro cells will need to be augmented by lower-power indoor and outdoor micro- and pico-cells. While such a move towards smaller cells will significantly increase the number of access points within a cellular system, will also lead to significant coverage overlap, both planned and unplanned, between cells.

Co-ordination of transmission and reception in today's cellular systems has been designed with the philosophy of "smart network, dumb user equipment," reflecting the telephone-centric mindset of a previous era. The "smart" network model is based on the premise that the network has a global view, and overall control, of everything that is occurring within the network. However, this assumption breaks down in a heterogeneous coverage environment as it is likely that no single, centralized network entity will have a global view and overall control. As an example, transmission and reception within a given cell is coordinated by the Access Point (AP) responsible for that cell. However, operation across cell boundaries may be un-coordinated due to different administrative domains or to difficulties encountered when communicating between APs. As a consequence, completely un-coordinated operation may ultimately result in unacceptable levels of interference that could negate the benefits of improved signal levels garnered through the use of smaller cells.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
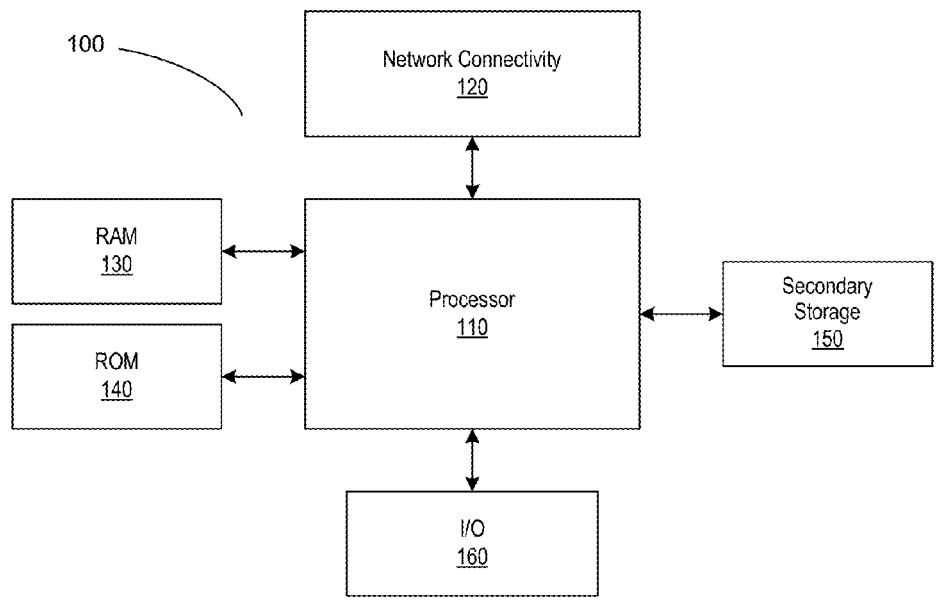
FIG. 1 depicts an exemplary user equipment (UE) device in which the present disclosure may be implemented.

The present disclosure is directed in general to wireless communications systems and methods for operating same. In one aspect, the present disclosure relates to the methods, systems and devices for user-equipment-empowered radio resource management to mitigate interference between wireless access points.

A system and method are provided for user-equipment-empowered radio resource management (RRM) to mitigate interference between wireless access points (APs). As used herein, RRM refers to system level control of co-channel interference and other radio transmission characteristics in wireless communication systems such as cellular and wireless networks. As such, RRM typically involves controlling parameters associated with transmission power, channel allocation, data rates, handover criteria, modulation schemes, error coding schemes, etc. In general, the objective of RRM is to utilize available radio network infrastructure and radio spectrum resources as efficiently as possible.

In various embodiments, user-equipment-device-empowered RRM includes transmission from a user equipment (UE) device to one or more APs for enabling cooperation to provide interference mitigation. In these and other embodiments, the UE device communicates channel conditions for cooperation to multiple APs, including its serving AP, through uplink (UL) transmission. Thus, a traditional direct connection (e.g., physical backhaul) between the APs is not required.

In one embodiment, the resource assignment for a UE device is given from the serving AP. Cooperating APs may receive information for interference avoidance from the UE device and the UE device may likewise indicate the radio resource they may use. As a result, prior negotiation between serving and cooperating APs regarding individual UE devices and resource selection is not required. In one embodiment, the cooperation may exist for only the resource and transmission indicated by the UE device's feedback. In various other embodiments, hybrid automatic repeat request (HARQ) approaches known to those of skill in the art are implemented to allow for interference diversity and prevent irresolvable conflicts for multiple retransmissions. In these and other embodiments, the implementation of HARQ approaches likewise provides in-band additional control information which can utilize both HARQ and AP cooperation of interference avoidance to improve reliability. In these various embodiments and others, the implementation of HARQ likewise provides the weighting of relative priorities for interference avoidance and serving a UE device for a given AP.

In various embodiments, an alternate feedback mechanism using AP-specific reference signals is implemented to enable AP cooperation. In these and other embodiments, UE device-initiated resource assignment schemes and mechanisms are implemented to enable cooperation for multiple transmissions without additional messaging from the UE device. In one embodiment, a subset of the UE devices within a cell communicate with more than one AP according to the previously described UE device-empowered RRM embodiments, while the remainder of the UE devices within the cell use other RRM schemes which may utilize communication with only one AP.

Those of skill in the art will appreciate that the described embodiments are useful in wireless network environments comprising a plurality of operators, administrative domains, or coverage areas, whether they are homogeneous or heterogeneous. Various of these embodiments are implemented in a homogeneous radio access technology (RAT) environment within a given channel with synchronization between APs on the downlink (DL) channel. Various other embodiments are not limited to such implementations and are instead implemented in environments without downlink synchronization of the APs and heterogeneous RATs operating on the same channel. In these various embodiments, a UE device is able to communicate a plurality of information bits on the UL to one or more APs in its cooperating set, including the serving AP. In various other embodiments, the UE device transmits AP-specific reference signals.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As used herein, the terms "user equipment" and "UE" can refer to wireless devices such as mobile telephones, smart phones, personal digital assistants (PDAs), handheld or laptop computers, and similar devices or other user equipment that has telecommunications capabilities. In some embodiments, the term "UE" may refer to a mobile, wireless device. The term "UE" may also refer to devices that have similar capabilities but that are not generally transportable, such as desktop computers, set-top boxes, sensors, or network nodes. The term "UE" is not limited to equipment with a user interface and may also include automated equipment such as remote sensors, meters, and other instruments.

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a UE device 100 suitable for implementing one or more embodiments disclosed herein. In various embodiments, the UE device 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or flash memory drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), touch screen displays, keyboards, keypads, switches, dials, mice, track balls, voice recognizers, card readers, paper tape readers, printers, video monitors, or other well-known input/output devices.

Figure 2:
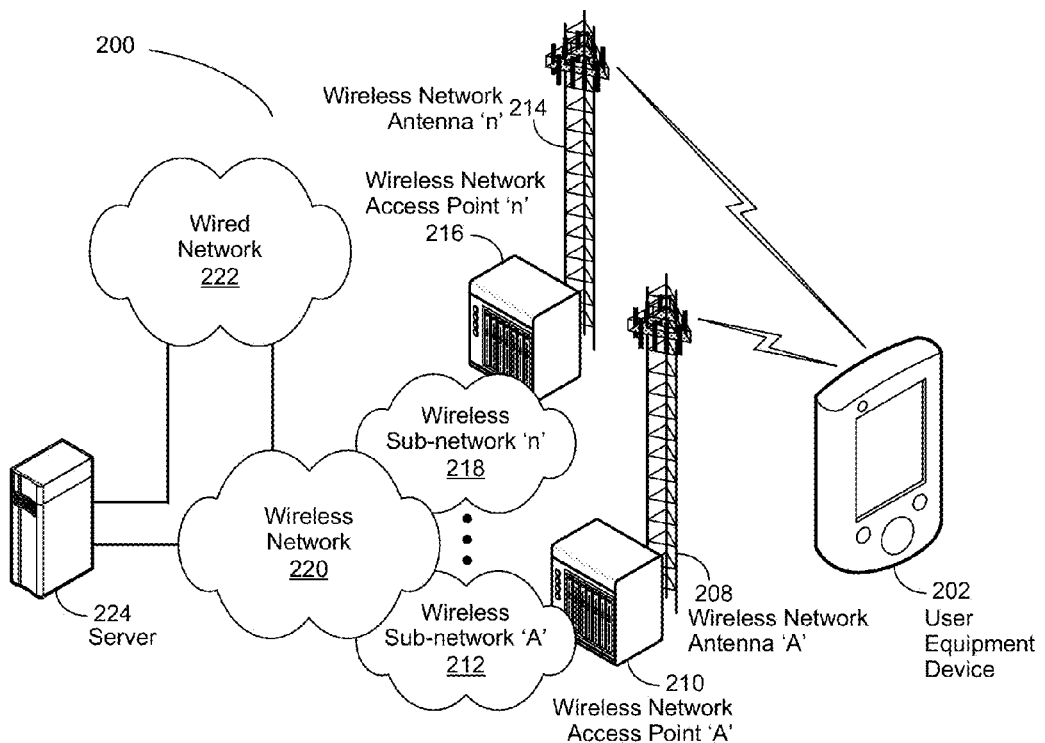
FIG. 2 shows a wireless communications system including an embodiment of a user equipment (UE) device.

FIG. 2 shows a wireless communications system including an embodiment of a user equipment (UE) device. Though illustrated as a mobile phone, the UE device 202 may take various forms including a mobile phone, a wireless handset, a pager, a personal digital assistant (PDA). In various embodiments, the UE device 202 may also comprise a portable computer, a tablet computer, a laptop computer, or any computing device operable to perform data communication operations. Many suitable devices combine some or all of these functions. In some embodiments, the UE device 202 is not a general purpose computing device like a portable, laptop, or tablet computer, but rather is a special-purpose communications device such as a telecommunications device installed in a vehicle. The UE device 202 may likewise be a device, include a device, or be included in a device that has similar capabilities but that is not transportable, such as a desktop computer, a set-top box, sensor, or a network node. In these and other embodiments, the UE device 202 may support specialized activities such as gaming, inventory control, job control, task management functions, and so on.

In various embodiments, the wireless network 220 comprises a plurality of wireless sub-networks (e.g., cells) 'A' 212 through 'n' 218. In these and other embodiments, the UE device 202 establishes a wireless communication session with wireless network antenna 'A' 208 through 'n' 214 (e.g., a cell tower), which are respectively coupled to a wireless network access point 'A' 210 through 'n' 216. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a wired network 222, such as the Internet. Via the wireless network 220 and the wired network 222, the UE device 202 has access to information on various servers, such as the server 224. Alternately, the UE device 202 may access the wireless network 220 through a peer UE device 202 acting as an intermediary, in a relay type or hop type of connection. Skilled practitioners of the art will recognized that many such embodiments are possible and the foregoing is not intended to limit the spirit, scope, or intention of the disclosure.

Figure 3:
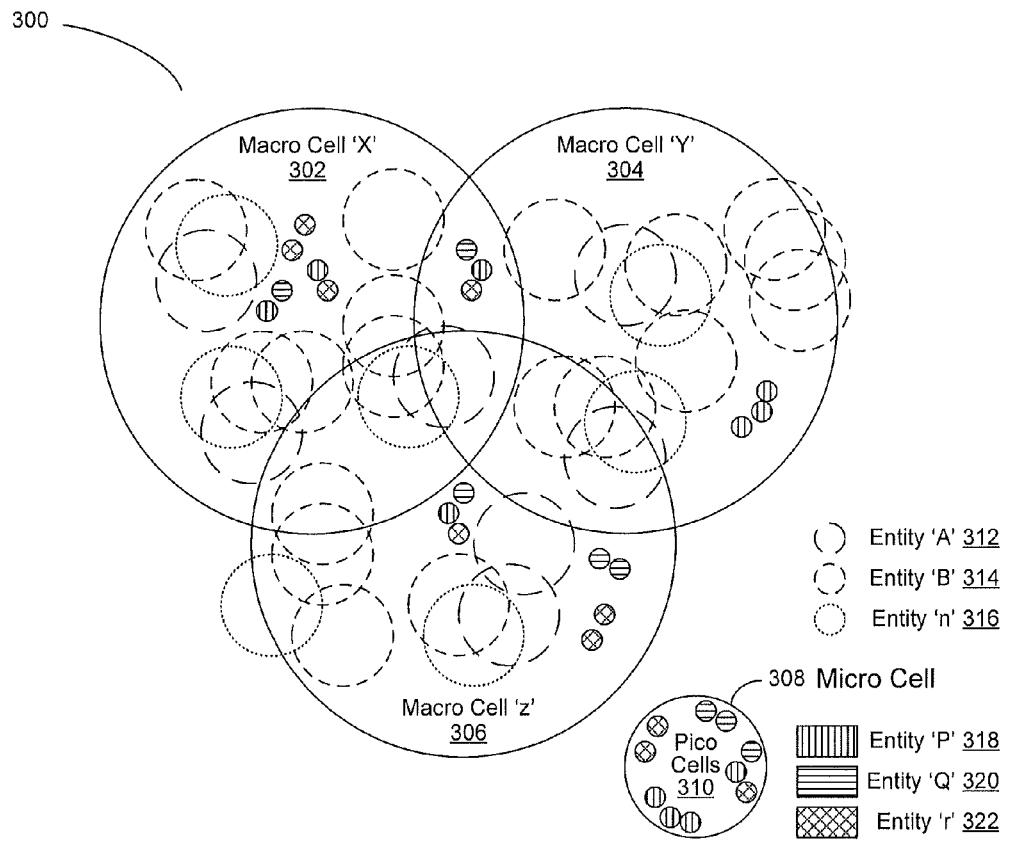
FIG. 3 is a simplified block diagram of a wireless network system comprising a plurality of macro cells, micro cells, and pico cells.

FIG. 3 is a simplified block diagram of a wireless network system comprising a plurality of macro cells, micro cells, and pico cells as implemented in accordance with an embodiment of the disclosure. In this embodiment, a wireless network system comprises a plurality of wireless network macro cells 'X' 302, 'Y' 304 through 'z' 306. In this and other embodiments, each of the wireless network macro cells 'X' 302, 'Y' 304 through 'z' 306 may comprise a plurality of wireless network micro cells 308, which in turn may comprise a plurality of wireless network pico cells 310. Likewise, the wireless network macro cells 'X' 302, 'Y' 304 through 'z' 306 may also comprise a plurality of individual wireless pico cells 310.

In various embodiments, the micro cells 308 may be associated with entity 'A' 312, 'B' 314 through 'n' 316, and the pico cells 310 may likewise be associated with entity 'P' 318, 'Q' 320 through 'r' 322. In these various embodiments, the wireless macro cells 'X' 302, 'Y' 304 through 'z' 306, micro cells 308, and pico cells 310 may comprise a plurality of wireless technologies and protocols, thereby creating a heterogeneous operating environment within the wireless network system 300. Likewise, each of the wireless macro cells 'X' 302, 'Y' 304 through 'z' 306, micro cells 308, and pico cells 310 comprises a corresponding access point (AP). As used herein, an AP is a generic term that broadly encompasses wireless LAN access points, macro cellular base stations (e.g., NodeB, eNB), micro- and pico-cells, relay nodes and home-based femtocells (e.g., HeNB), or any telecommunications technology operable to establish and sustain a wireless communication session.

Skilled practitioners of the art are aware that future wireless network systems will likely rely on denser deployments of heterogeneous network technologies such as that shown in FIG. 3. Accordingly, there is a corresponding need for the mitigation of interference to enhance performance, which requires cooperation between the aforementioned APs. However, current deployments may not have reliable, or for that matter any, direct communication paths (e.g., physical backhaul) between APs. As a result, interference mitigation cannot occur as there is no mechanism for one AP to cooperate with another AP. Furthermore, realization of real-time channel-dependent cooperation between multiple APs may be unachievable if any available direct communication paths are unable to sustain sufficient throughput.

Various approaches to this issue are known, including having APs communicate either directly through physical backhaul networks or through a centralized control structure to coordinate communications. One iterative approach is for the AP to coordinate UE devices to be transmitted to and the resources to be transmitted. Another approach is to have the AP to act as a master manager for a set of radio resources. In one such example, a zone of resources can be specified for coordinated transmission as described in greater detail herein. However, this approach requires not only the aforementioned direct communication between APs, but also a means to converge UE device selection and resource assignment between various APs. Furthermore, this coordination is also limited to the resources specified within the zone. Moreover, there is the further drawback that either the communications path or the coordination procedure, or both, is too slow to make use of small-scale variation within the channel.

One proposed approach has each AP transmitting downlink precoded reference signals (RQI-RS's) preceding an actual data transmission, with the same transmission properties (e.g. spatial beam, power allocation, rank etc.) as the corresponding following data transmission. Such an RQI-RS corresponding to a specific (e.g., time/frequency) resource unit is used by UE devices to measure short-term signal and interference, thereby allowing for accurate resource specific quality indicator (RQI) fed back to the serving (H)eNB reference signals (RS). However, there may be significant signaling overhead required from each UE device as multiple RQI's may have to be fed back to the AP. In addition, potential gains achieved by avoiding frequency-selective fading may be offset if the packet transmissions are large enough to warrant the simultaneous allocation of many resources across multiple sub-bands. Furthermore, the opportunistic adaption to the channel is less effective than directly adapting to the particular channel conditions of individual UE devices directly if only a few UE devices are being served by an AP.

Figure 4:
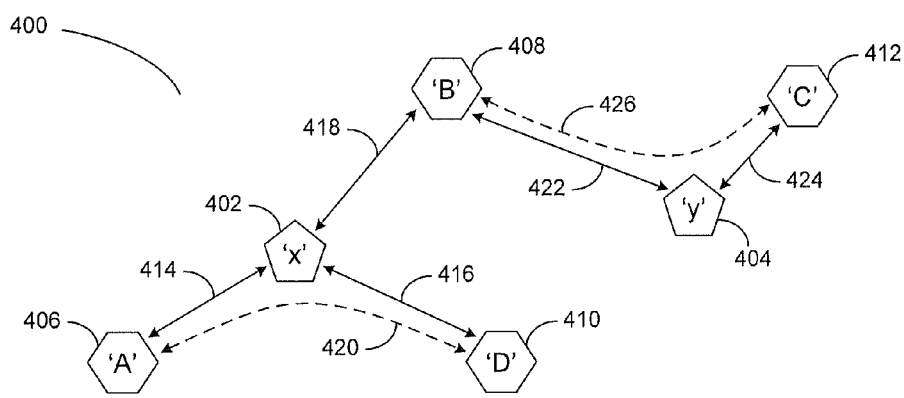
FIG. 4 is a simplified block diagram of a signaling plane communications model used for UE device-empowered radio resource management (RRM)

FIG. 4 is a simplified block diagram of a signaling plane communications model as implemented in accordance with an embodiment of the disclosure for user-equipment-device-empowered radio resources management (RRM). In this embodiment, the signaling plane communications model 600 comprises access points (APs) 'A' 406, 'B' 408, 'C' 412, 'D' 410, and user equipment (UE) devices 'x' 402 and 'y' 404.

Skilled practitioners of the art will be aware that traditional communication between APs 'A' 406, 'B' 408, 'C' 412, and 'D' 410 within a given coverage area may be difficult, if not impossible, due to a number of factors. As an example, APs 'A' 406, 'B' 408, 'C' 412, and 'D' 410 may be located within different Radio Access Networks (RANs) that are owned or operated by different business entities, particularly in radio frequency bands where spectrum licenses are pooled, shared or where the spectrum is unlicensed. As another example, APs 'A' 406, 'B' 408, 'C' 412, and 'D' 410 may be located within different RANs with no communications path between RANs. As yet another example, APs 'A' 406, 'B' 408, 'C' 412, and 'D' 410 may be located within the same RAN but the backhaul infrastructure may not provide a communications path between the APs 'A' 406, 'B' 408, 'C' 412, and 'D' 410. As still another example, the backhaul infrastructure may not offer the bandwidth or latency necessary to meet inter-AP signaling requirements between APs 'A' 406, 'B' 408, 'C' 412, and 'D' 410. As yet still another example, one or more APs 'A' 406, 'B' 408, 'C' 412, and 'D' 410 may be out-of-range of each other, thereby precluding direct, over-the-air (OTA) communication.

Therefore, the only direct communications path assumed by the signaling plane communications model 600 is between an Access Point (e.g., APs 'A' 406, 'B' 408, 'C' 412, or 'D' 410) in a RAN and a UE device (e.g., UE device 'x' 402 or 'y' 404). Accordingly, APs located within the same RAN or in different RANs may only be able to communicate indirectly via a UE device that has a direct communication path with each of the APs.

For example, as shown in FIG. 4, UE device 'x' 402 respectively has direct communications paths 414, 418, 416 to APs 'A' 406, 'B' 408, and 'D' 410, while UE device 'y' 404 respectively has direct communications paths 422, 424 to APs 'B' 408 and 'C' 412. Accordingly, if AP 'A' 406 needs to communicate with AP 'D' 410, it would do so by first establishing a wireless connection to UE device 'x' 402, which in turn would establish a connection to AP 'D' 410. As a result, an indirect connection 420 is established between AP 'A' 406 and AP 'B' 408, regardless of whether a direct connection (e.g. via a backbone network) exists between them. Likewise, if AP 'B' 408 needs to communicate with AP 'C' 410, it would do so by first establishing a wireless connection to UE device 'y' 404, which in turn would establish a connection to AP 'C' 412. As a result, an indirect connection 426 is established between AP 'B' 408 and AP 'C' 412. Communications between APs may be explicit or implicit. For example, AP 'A' 406 may explicitly send information addressed to AP 'B' 408 via UE device 'x' 402 or AP 'A' 406 may send information addressed to UE device 'x' 402 with implicit knowledge that UE device 'x' 402 will extract the relevant information and forward it to AP 'B' 408. Furthermore the UE device may add or generate information to enable cooperation between AP 'A' 406 and AP 'B' 408, and send it one or both AP's. Thus, as shown in FIG. 4, UE devices 'x' 402 and 'y' 404 provide the means for enabling co-ordination and co-operation between APs 'A' 406, 'B' 408, 'C' 412, and 'D' 410, both within and between their respective administrative domains and wireless technologies.

Figure 5:
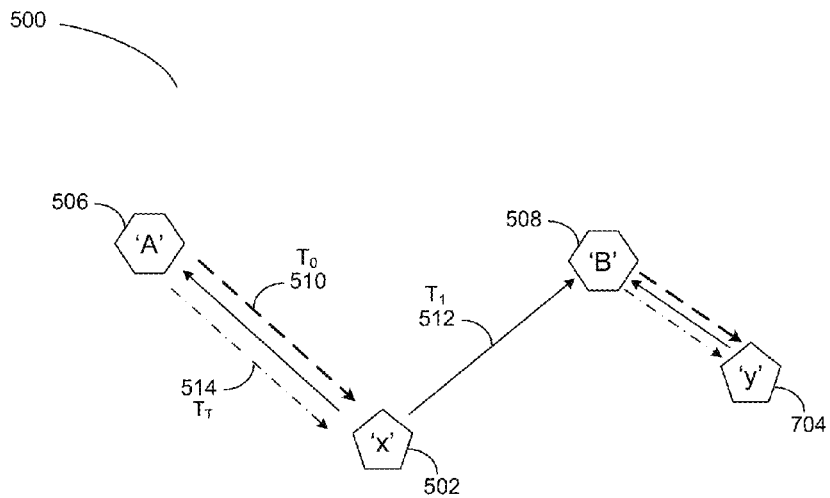
FIG. 5 is a simplified block diagram showing UE device-empowered RRM.

FIG. 5 is a simplified block diagram showing user-equipment-device-empowered radio resource management (RRM) as implemented in accordance with an embodiment of the disclosure. In this embodiment, the signaling flow for downlink (DL) radio resource allocation begins at some time $T_0$ 510 with the initiation of allocating radio resources by a serving access point (AP) 'A' 506 that has registered user equipment (UE) device 'x' 502 upon it entering the coverage area of the serving AP 'A' 506. The serving AP 'A' 506 then schedules the UE device 'x' 502 for use of a radio resource at a future time $T_T > T_0$. At some time $T_1$ 512 prior to time $T_T$ 514, the UE device 'x' 502 transmits a feedback message, or other indication, to the cooperating AP 'B' 508 and the serving AP 'A' 506. This allows the UE device 'x' 502 to provide cooperation information to both serving AP 'A' 506 and cooperating AP 'B' 508 based on observed conditions at the UE device 'x' 502 and the initial radio resource assignment. At the aforementioned time $T_T$ 514, the serving AP 'A' 506 transmits information to the UE device 'x' 502 using the assigned radio resource.

In various embodiments, it is possible that the UE device 'x' 502 has more than one serving AP. In these and other embodiments, the UE device 'x' 502 likewise registers itself with one or more cooperating APs (e.g., cooperating AP 'B' 508), which are APs which the UE device 'x' 502 is able to contact through uplink (UL) signaling to enable cooperation. In various embodiments, any serving APs (e.g., serving AP 'A' 506) are necessarily part of the cooperating set of APs (e.g., cooperating AP 'B' 508). However, in these and other embodiments, a cooperating AP (e.g., cooperating AP 'B' 508) may not require registration of the UE device 'x' 502 in advance of receiving a cooperation request message from the UE device 'x' 502. In various other embodiments, the UE device 'x' 502 may register with all members of the set of cooperating APs (e.g., cooperating AP 'B' 508) in order to facilitate UL communications and cooperation.

In one embodiment, the UE device 'x' 502 initiates cooperative transmissions from multiple APs, beginning with the serving AP 'A' 506 sending an initial assignment message to the UE device 'x' 502 that indicates which set of radio resources have been assigned specifically to the UE device 'x' 502 for the purpose of future packet transmission. In this and other embodiments, the future assignment of radio resources may be for multiple hybrid automatic repeat request (HARQ) transmissions and possibly other packets.

In one embodiment, the UE device 'x' 502 indicates the assignment to other non-serving but cooperating APs by directly signaling the cooperating APs in a manner that indicates the assigned resources and an aspect (e.g. spatial information or other transmission parameter such as directional vector, spreading sequence set, etc) of the assigned resources to the cooperating APs. In one embodiment, the cooperating AP 'B' 508 may receive an indication from the UE device 'x' 502 for a first resource, and may also send an initial assignment to one or more UE devices 'y' 504, for the same first resource. In another embodiment, the cooperating AP 'B' 508 authenticates the message for AP cooperation received from the UE device 'x' 502 by a token included in the message that was passed from the serving AP 'A' 506 to the UE device 'x' 502.

In various embodiments, and as described in greater detail herein, the UE device 'x' 502 may communicate with a plurality of cooperating APs (e.g., cooperating AP 'B' 508). Accordingly, each of the cooperating APs may receive an indication from the UE device 'x' 502 for a first resource. Further, each of the cooperating APs may receive an indication from additional UE devices for the same first resource, and each of these APs may send an initial assignment to one or more UE devices for the same first resource.

In one embodiment, the UE device 'x' 502 indicates the assignment of the radio resources to the cooperating AP 'B' 508 by sending reference signals (e.g., pilot tones) in a manner that indicates the assigned radio resources and an aspect of the assigned resources to the cooperating AP 'B' 508. In another embodiment, radio resources are implicitly assigned to a feedback channel for the UE device 'x' 502 to the serving AP 'A' 506. In this embodiment, the radio resources may be non-exclusively assigned to other cooperating APs, based on the set of radio resources assigned to the UE device 'x' 502 by the serving AP 'A' 506 at an earlier time.

In yet another embodiment, the initial assignment message from the serving AP 'A' 506 comprises, either explicitly or implicitly, an indication of the identity the UE device 'x' 502 and its assigned set of resources. In one implementation of this embodiment, the serving AP 'A' 506 sends other or additional control information in the initial assignment message. In this and other embodiments, the aforementioned other or additional control information is sent to the UE device 'x' 502 by using the radio resources assigned to the UE device 'x' 502 in a manner known to the UE device 'x' 502. In one embodiment, an indication of the presence, location and size of the control information within the assigned set of radio resources is contained in a predetermined field of the initial assignment message.

In one embodiment the UE device 'x' 502 may select a subset of the radio resources from the proposed set for assignment and send indications of the selected subset of resources to multiple cooperating APs (e.g., cooperating AP 'B' 508), including the serving AP 'A' 506. In another embodiment, the serving AP 'A' 506 and the cooperating AP 'B' 508 may respectively broadcast or otherwise indicate the radio resources available for selection by the UE device 'x' 502 or the UE device 'y' 504. In yet another embodiment, the serving AP 'A' 506 and the cooperating AP 'B' 508 may respectively broadcast or otherwise indicate the radio resources available for selection by the UE device 'x' 502 or the UE device 'y' 504 within a predetermined group of UE devices. In still another embodiment, the UE device 'x' 502 dynamically selects its serving AP (e.g., serving AP 'A' 506).

In various embodiments, one or more serving APs (e.g., serving AP 'A' 506) use available dimensions of the channel to multiplex the signal vectors to be transmitted, and the signal vectors to avoid, to avoid interference with one or more cooperating APs (e.g., cooperating AP 'B' 508). In these and other embodiments, the one or more serving APs and one or more cooperating APs cooperate for a single transmission when they have received feedback or other indications from a UE device. In one embodiment, the one or more serving APs and one or more cooperating APs cooperate on an initial, or most recent feedback, received from one or more UE devices on the same resource, and a cooperating AP (e.g., cooperating AP 'B' 508) may continue to cooperate until a message is received to cancel cooperation from each of the UE devices. In another embodiment, the cooperating AP 'B' 508 continues to cooperate, using transmissions without feedback from the UE device 'x' 502. In this embodiment, if the serving AP 'A' 506 uses an AP-specific HARQ resource/timing pattern, the cooperating AP 'B' 508 is provided with the identification of the serving AP 'A' 506 such that it is aware of the pattern.

In one embodiment, the HARQ or other multiple transmissions from the serving AP 'A' 506 to the UE device 'x' 502 uses one or more of an AP-specific interval between transmissions, an AP-specific predetermined pattern of changing the interval between transmissions, or an AP-specific resource hopping pattern for each transmission. In another embodiment, the available dimension of the transmission channel, and transmission is prioritized to simultaneously avoid interfering with other UE devices receiving transmissions from other APs to achieve inter-AP cooperation. In this embodiment, the prioritization is prioritized according to the HARQ transmission number, the application priority, and the buffer status. In one embodiment, cooperation between APs occurs without time synchronization between the multiple cooperating APs, and in some embodiments, without using the same wireless technology in all of the cooperating APs. In another embodiment, handover is assisted by the cooperating UE device and facilitated by the described embodiments of radio resource allocation described in greater detail herein.

Figure 6:
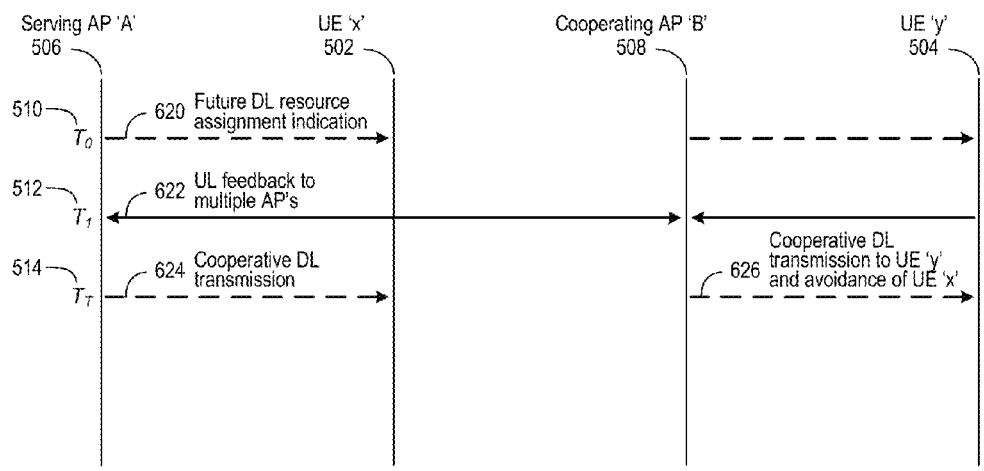
FIG. 6 shows a process signal flow for UE device-empowered RRM to mitigate interference between access points (APs)

FIG. 6 shows a process signal flow for user-equipment-empowered radio resource management (RRM) to mitigate interference between wireless access points as implemented in an embodiment of the disclosure. In this embodiment, at some time $T_0$ 510, the serving AP 'A' 506 schedules the user equipment (UE) device 'x' 502 for use of a radio resource of time frequency dimensions, R, at time $T_T > T_0$. This is the initial radio resource assignment and it is indicated to the UE device 'x' 502 through an initial resource assignment message 620.

At some time $T_1$ 512, the UE device 'x' 502 transmits a feedback message 622, or other indication to the one or more cooperating APs, including the serving AP 'A' 506, on the uplink (UL). This allows the UE device 'x' 502 to provide cooperation information to all APs based on observed conditions at the UE device 'x' 502 and the initial radio resource assignment. At the aforementioned time $T_T$ 514, the serving AP 'A' 506 transmits 624 to the UE device 'x' 502 using resource R and using information provided by the UE device 'x' 502 for channel adaptation. At time $T_T$ 514, the other members of the cooperating set of APs also make transmissions 626, for example cooperating AP 'B' 508 transmission to UE device 'y' 504, taking into account channel and other information transmitted by the UE device 'x' 502 at time $T_1$ 512 for cooperation.

In this and other embodiments, the RRM process can be optionally extended to multiple assignments over multiple frames for the purpose of hybrid automatic repeat request (HARQ) transmissions. To do so, previous assignment process flow is extended to have the serving AP 'A' 506 at time $T_0$ 510 schedule the UE device 'x' 502 to use radio resource of time frequency dimensions, R, at time $T_T > T_0$. As before, this is the initial resource assignment and it is indicated to the UE device 'x' 502 through an initial resource assignment message 620.

The assignment applies for all HARQ transmissions at time, $T_T$ 514, and subsequent time $T_T + nT_H$, where $T_H$ is the interval between HARQ transmissions. In some embodiments, the value of $T_H$ may be different for each AP in the cooperation set in an attempt to avoid collisions during retransmission. In some embodiments, the value of $T_H$ may be changed in a predetermined, and AP-specific, manner with each retransmission in an attempt to avoid repeated collisions during retransmission.

At some time $T_1$ 512, the UE device 'x' 502 transmits a message or other indication to the one or more cooperating APs, including the serving AP 'A' 506 on the UL. This allows the UE device 'x' 502 to provide cooperation information to all APs based on observed conditions at the UE device 'x' 502 and the initial radio resource assignment. At some time $T_T$ 514, the serving AP 'A' 506 transmits to the UE device 'x' 502 on resource R using feedback information optionally provided by the UE device 'x' 502. The other members of the cooperating set of APs may also transmit to other UE devices, taking into account the information transmitted by UE device 'x' 502 at time $T_1$ 512 for cooperation.

At some time $T_2$, where $T_T < T_2 < T_T + T_H$ the UE device 'x' 502 transmits a feedback message to the one or more cooperating APs, including the serving AP 'A' 506 on the UL. This allows the UE device 'x' 502 to provide cooperation information to all APs based on observed conditions at the UE device 'x' 502. It also serves as an indication to all APs that a packet requires another retransmission and that the radio resource is in use. At the aforementioned time $T_T + T_H$, the serving AP 'A' 506 transmits a HARQ transmission of the packet to the UE device 'x' 502 on resource R using information provided by the UE device 'x' 502 for channel adaptation. The other members of the cooperating set of APs also make transmissions (e.g., cooperating AP 'B' 508 UE device 'y' 504), taking into account channel and other information transmitted by the UE device 'x' 502 at time $T_2$ for cooperation.

Assuming the packet is successfully received after two transmissions, at some time $T_3$, where $T_T + T_H < T_3 < T_T + 2T_H$ the UE device 'x' 502 transmits a message to the one or more cooperating APs, including the serving AP 'A' 506 on the UL that further transmission are not needed. In some embodiments, only a feedback message to the serving AP 'A' 506 is needed to end packet HARQ transmissions as other APs will ignore cooperation on the radio resource unless a message is received for each transmission.

Figure 7:
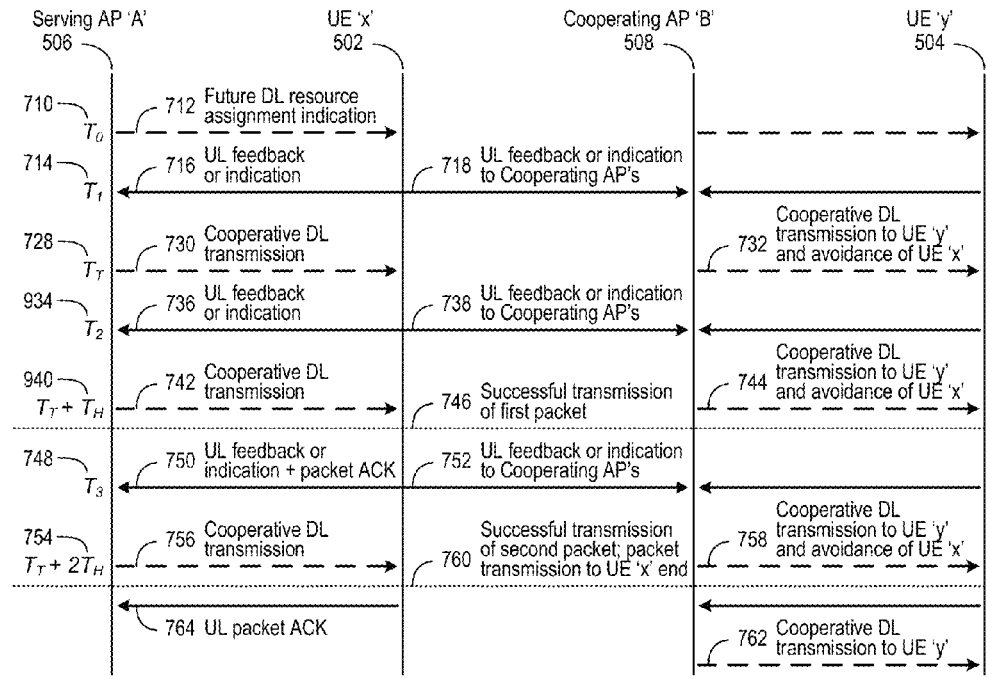
FIG. 7 shows a process signal flow for UE device-empowered RRM for AP-initiated hybrid automatic repeat request (HARQ)/periodic assignments as implemented for uplink (UL) feedback or indication per transmission to cooperating APs.

FIG. 7 shows a process signal flow for user-equipment-device-empowered radio resource management (RRM) for access point (AP)-initiated hybrid automatic repeat request (HARQ)/periodic assignments as implemented in accordance with an embodiment of the disclosure for uplink (UL) feedback or indication per transmission to cooperating APs. In this embodiment, the user-equipment-empowered RRM process is extended to multiple, successive assignments over multiple frames for the purpose of multiple packet transmissions, with each packet transmission potentially having N HARQ transmissions. To do so, the assignment of radio resources by the serving AP(s) is used for HARQ transmissions as well as subsequent packet transmissions and the radio resource remains assigned to the user equipment (UE) device until explicitly released while other cooperating APs will ignore cooperation on the radio resource unless a message is received for each transmission.

As shown in FIG. 7, the RRM process signal flow shown in FIG. 6 is extended such that at some time $T_0$ 710 the serving AP 'A' 506 schedules the UE device 'x' 502 for use of a radio resource of time frequency dimensions, R, at time $T_T > T_0$. This is the initial radio resource assignment and it is indicated to the UE device 'x' 502 through an initial resource assignment message 712. The assignment applies for all transmissions, whether they are HARQ transmissions or transmission of another packet at time $T_T$ 728, and subsequent times $T_T + nT_H$ where $T_H$ is the interval between HARQ transmissions. In some embodiments, the value of $T_H$ may be different for each AP in the cooperation set in an attempt to avoid collisions during retransmission. In some embodiments, the value of $T_H$ may be changed in a predetermined, and AP-specific, manner with each retransmission in an attempt to avoid repeated collisions during retransmission.

At some time $T_1$ 714 prior to $T_T$ 928, the UE device 'x' 502 transmits 716 a feedback message or other indication to the one or more cooperating APs, including the serving AP 'A' 506 on the uplink (UL). This allows the UE device 'x' 502 to provide cooperation information 718 to all APs based on observed conditions at the UE device 'x' 502 and the initial radio resource assignment. At the aforementioned time $T_T$ 728, the serving AP 'A' 506 transmits 730 to the UE device 'x' 502 on radio resource R using feedback information optionally provided by the UE device 'x' 502. The other members of the cooperating set of APs may also transmit 932 to other UE devices (e.g., UE device 'y' 504), taking into account information transmitted by UE device 'x' 502 at time $T_1$ 714 for cooperation.

At some time $T_2$ 734, where $T_T < T_2 < T_T + T_H$, the UE device 'x' 502 transmits 736, 738 a feedback message or other indication to the one or more cooperating APs (e.g., cooperating AP 'B' 508), and to the serving AP 'A' 506 on the UL. In some embodiments, this allows the UE device 'x' 502 to provide cooperation information 736, 738 to serving and cooperating APs based on observed conditions at the UE device 'x' 502. In other embodiments, it serves as an indication to serving and cooperating APs that the resource is still in use either for a HARQ retransmission or for a new packet transmission. In still further embodiments, it provides both functions of resource utilization and observed condition update. In some embodiments, cooperation for the UE device 'x' 502 is continued at cooperating APs (e.g., cooperating AP 'B' 508) as long some indication 938 from the UE device 'x' 502 is received prior to each transmission. In some embodiments, the feedback 736 indicates positive or negative acknowledgement of successful packet reception and decoding to the serving AP 'A' 506.

At some time $T_T+T_H$ 740, the serving AP 'A' 506 transmits 742 either a HARQ transmission of the packet or a new packet transmission to the UE device 'x' 502 on resource R using feedback information optionally provided by the UE device 'x' 502. The other members of the cooperating set of APs also make transmissions 744 to other UE devices (e.g., cooperating AP 'B' 508 to UE device 'y' 504), taking into account information transmitted by UE device 'x' 502 at time $T_2$ 734 for cooperation.

Assuming the packet is successfully received after two transmissions 746, at some time $T_3$ 748 where $T_T+T_H<T_3<T_T+2T_H$, the UE device 'x' 502 transmits a feedback message 750 or other indication to at least the serving AP 'A' 506 on the UL that the packet has been successfully received, which may imply that further HARQ transmissions of the packet are not needed and to begin a new packet transmission, if applicable. In some embodiments, cooperation for UE device 'x' 502 is continued at cooperating APs (e.g., cooperating AP 'B' 508) as long some indication or observed feedback of conditions from the UE device 'x' 502 is received prior to each transmission, hence an indication or observed feedback 752 of conditions at the UE device 'x' 502 is sent for the next packet transmission, if applicable, at this time. In some embodiments, this allows the UE device 'x' 502 to provide cooperation information 750, 752 to serving and cooperating APs based on observed conditions at the UE device 'x' 502. In other embodiments, it provides an indication 750, 752 to serving and cooperating APs that the resource is still in use either for a HARQ retransmission or for a new packet transmission. In still further embodiments, it provides both functions of resource utilization and observed condition update.

In some embodiments, if there is another packet to transmit, then at some time $T_T+nT_H$, (e.g. $T_T+2T_H$ 754) the serving AP 'A' 506 transmits 756 a new packet transmission, to the UE device 'x' 502 on resource R using information provided by the UE device 'x' 502. The other members of the cooperating set of APs also make transmissions 758 to other UE devices (e.g., UE device 'y' 504), taking into account information transmitted by UE device 'x' 502 at time $T_3$ 748 for cooperation.

Assuming the second packet is successfully received at the UE device 'x' 502 after this transmission 760, the UE device 'x' 502 transmits a feedback message 764 or other indication to at least the serving AP 'A' 506 on the UL that the packet has been successfully received. In some embodiments, feedback or indications are not sent to the other members of the cooperating set of APs, and hence these AP's make transmissions 762 to other UE devices (e.g., UE device 'y' 504) without consideration of transmission to UE 'x' 502. In this embodiment, cooperation requires per-transmission feedback.

In addition to the steps described above, in some embodiments the size and position of the resource are changed either through a request from the UE device 'x' 502 through UL feedback, or indicated by the AP at in a separate message. In the embodiment described where the cooperation is per-transmission, the UE device 'x' 502 indicates to cooperating APs (e.g., cooperating AP 'B' 508) the changed resource size for the appropriate transmissions. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

As described in greater detail herein, feedback to the serving and cooperating APs is sent via explicit messages to each AP in various embodiments. In some systems, channel reciprocity can be exploited in the feedback message using AP- or resource-specific sounding. In some embodiments that utilize channel reciprocity in the uplink (UL) and downlink (DL), such as time division-duplex (TDD) systems, reference signals can be transmitted by the UE device rather than feedback messages to the serving or non-serving APs. Those of skill in the art will realize that while this process minimizes the overhead, it may not allow the sending UE device to be uniquely identified.

In one embodiment, each AP avoids the assignment to specific UE devices on certain AP-specific radio resource elements per resource block to receive reference signal transmissions from various UE devices. In some cases, the AP may not assign the AP-specific resource elements reserved for reference signals to any AP in order to prevent interference. Various UE devices send reference signals to each AP using the AP-specific resource elements. The resource elements to be used are indicated by a broadcast message sent from each AP, such as in the management information base (MIB) in a Long Term Evolution (LTE) implementation, or they are derivable from the AP-identifier. In one implementation of this embodiment, the UE device sends the reference signal according to the best spatial vector, or other transmission parameter, on AP-specific resource elements for the resource blocks it will be using such that the receiving AP is aware of the transmission parameters that would cause the greatest, or least, interference. In another implementation, the UE device sends the reference signal on the AP-specific resource elements according to the spatial vector, or other transmission parameter, that would create the greatest amount of interference to the desired signal from the serving AP. The estimate of the transmission parameters expected from the serving AP is based on UE device's feedback to the serving AP.

In one embodiment, each UE device transmits specific reference signals at a fixed, or AP-specified power level such that the AP is able to receive the different signals and determine relative channel gains. In some embodiments using interference avoidance, the AP will receive the composite interference on these resource elements for a given resource block, and use this composite interference as the interference vector to avoid. As described in greater detail herein, the cooperation in avoiding interference to a UE device by APs other than the serving AP occurs for each transmission that a UE device transmits feedback to an AP. If a UE device does not transmit feedback for cooperation to an AP for a given transmission, cooperation does not occur. In one embodiment, the allocation process can be optionally extended to multiple successive assignments over multiple frames for the purpose of multiple packet transmissions (e.g., HARQ retransmission or new packets) where cooperation continues without per transmission UL feedback to APs. Feedback is not required to continue the cooperation. However the UE device may choose to send a UL message to APs updating channel conditions, or updating details of the resource assignment.

Figure 8:
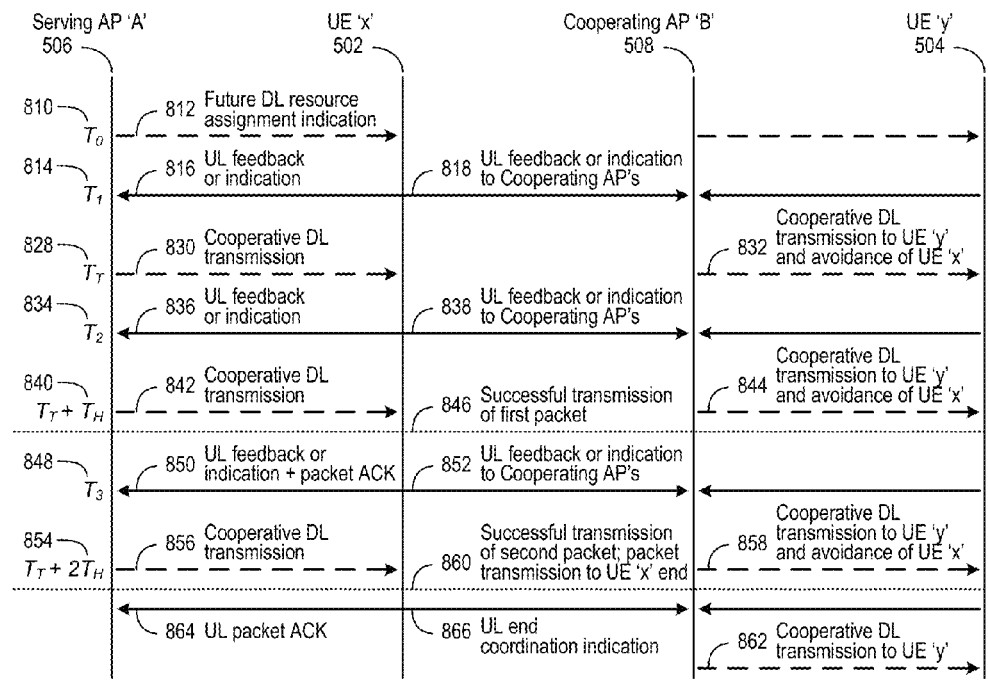
FIG. 8 shows a process signal flow for UE device-empowered RRM for AP-initiated HARQ/periodic assignments as implemented for continued cooperation of APs until canceled by the UE device.

FIG. 8 shows a process signal flow for user-equipment-empowered radio resource management (RRM) for access point (AP)-initiated hybrid automatic repeat request (HARQ)/periodic assignments as implemented in accordance with an embodiment of the disclosure for continued cooperation of APs until canceled by the user equipment (UE) device. As shown in FIG. 8, the RRM process signal flow shown in FIG. 6 is extended such that at some time $T_0$ 810 the serving AP 'A' 506 schedules the UE device 'x' 502 for use of a radio resource of time frequency dimensions, R, at time interval $T_T > T_0$. This is the initial radio resource assignment and it is indicated to the UE device 'x' 502 through an initial resource assignment message 812. The assignment applies for all transmissions, whether they are HARQ transmissions or transmission of another packet at time $T_T$ 828, and subsequent time intervals $T_T + nT_H$ where $T_H$ is the interval between HARQ transmissions. In some embodiments, the value of $T_H$ may be different for each AP in the cooperation set in an attempt to avoid collisions during retransmission. In some embodiments, the value of $T_H$ may be changed in a predetermined, and AP-specific, manner with each retransmission in an attempt to avoid repeated collisions during retransmission.

At some time $T_1$ 814, the UE device 'x' 502 transmits 816 a feedback message or other indication to the one or more cooperating APs, including the serving AP 'A' 506 on the uplink (UL). This allows the UE device 'x' 502 to provide cooperation information 1018 to all APs based on observed conditions at the UE device 'x' 502 and the initial radio resource assignment.

At some time $T_T$ 828, the serving AP 'A' 506 transmits 830 to the UE device 'x' 502 on radio resource R using feedback information optionally provided by the UE device 'x' 502. The other members of the cooperating set of APs may also transmit 832 to other UE devices (e.g., UE device 'y' 504), taking into account information transmitted by UE device 'x' 502 at time $T_1$ 814 for cooperation.

At some time $T_2$ 834, where $T_T < T_2 < T_T + T_H$, the UE device 'x' 502 transmits 836, 838 a feedback message or other indication to the one or more cooperating APs (e.g., cooperating AP 'B' 508), and to the serving AP 'A' 506 on the UL. In some embodiments, the UE device 'x' 502 does not transmit a feedback message 838 to the cooperating APs (e.g., AP 'B' 508) and cooperation for UE device 'x' 502 is continued at cooperating APs based on the last feedback of cooperating information 818 from the UE device 'x' 502 (e.g. feedback message 838 from UE 'x' 502 to AP 'B' 508 does not occur). In certain of these and other embodiments, the cooperation for UE device 'x' 502 is continued at cooperating APs (e.g., cooperating AP 'B' 508) based on the last feedback of cooperating information from the UE device 'x' 502 unless a feedback message is received to cancel the assignment reported by the UE device 'x' 502. It will be apparent to those of skill in the art that the radio resource location, or pattern, of the cooperation would not need to be transmitted as it is established in the initial coordination. In some embodiments, the feedback message is transmitted to one or more of serving and cooperating AP's and allows the UE device 'x' 502 to provide cooperation information 838 to serving 836 and cooperating APs (e.g., cooperating AP 'B' 508) based on observed conditions at the UE device 'x' 502. In other embodiments where the continued cooperation may time-out, it serves as an indication 836, 838 to serving and cooperating APs (e.g., cooperating AP 'B' 508) that the radio resource is still in use either for a HARQ retransmission or for a new packet transmission. In still further embodiments, it provides both functions of resource utilization and observed condition update. In some embodiments, the feedback message 836 indicates positive or negative acknowledgement of successful packet reception and decoding to the serving AP 'A' 506.

At some time $T_T + T_H$ 1040, the serving AP 'A' 506 transmits 842 either a HARQ transmission of the packet or a new packet transmission to the UE device 'x' 502 on resource R using feedback information optionally provided by the UE device 'x' 502. The other members of the cooperating set of APs also make transmissions 844 to other UE devices (e.g., cooperating AP 'B' 508 to UE device 'y' 504), taking into account information transmitted by UE device 'x' 502 at time $T_2$ 834 for cooperation.

In some embodiments, assuming the packet is successfully received after two transmissions 846, at some time $T_3$ 848 where $T_T + T_H < T_3 < T_T + 2T_H$, the UE device 'x' 502 transmits a feedback message 1050 or other indication to at least the serving AP 'A' 506 on the UL that the packet has been successfully received, which may imply that further HARQ transmissions of the packet are not needed and to begin a new packet transmission, if applicable. In some embodiments, only a feedback message 850 to the serving AP 'A' 506 is needed to signal the end of the packet HARQ transmissions, as other APs will continue to provide cooperation on the radio resource unless a feedback message is received to cancel the assignment reported by the UE device 'x' 502 (e.g. feedback message 852 from UE 'x' 502 to AP 'B' 508 does not occur). In one embodiment, the cooperation is continued by cooperating APs (e.g., cooperating AP 'B' 508) without additional messaging 852. It will apparent to those of skill in the art that the radio resource location, or pattern, of the cooperation would not need to be transmitted as it is established in the initial coordination. However, in some embodiments, the UE device 'x' 502 may send UL feedback information to one or more of serving 850 and cooperating AP's 852 to update the channel condition observed at the UE device 'x' 502 from the serving AP 'A' 506 and cooperating AP (e.g., cooperating AP 'B' 508). In other embodiments, where the continued cooperation may time-out, it serves as an indication 850, 852 to one or more of serving and cooperating APs (e.g., cooperating AP 'B' 508) that the radio resource is still in use either for a HARQ retransmission or for a new packet transmission. In still further embodiments, it provides both functions of resource utilization and observed condition update.

In some embodiments, if there is another packet to transmit, then at some time $T_T + nT_H$, (e.g. $T_T + 2T_H$ 1054) the serving AP 'A' 506 transmits 856 a HARQ transmission of the packet, or possibly new packet transmission, to the UE device 'x' 502 on resource R using information provided by the UE device 'x' 502. The other members of the cooperating set of APs also make transmissions 858 to other UE devices (e.g., UE device 'y' 504), taking into account information transmitted by UE device 'x' 502 at time $T_3$ 848 for cooperation.

Assuming a second packet is successfully received at UE device 'x' 502 after this transmission 860, the UE device 'x' 502 transmits a feedback message 864 or other indication to at least the serving AP 'A' 506 on the UL that the packet has been successfully received. In some embodiments, the UE device 'x' 502 may end the continued cooperation by sending feedback or indications 866 other members of the cooperating set of APs. In these and other embodiments, these cooperating APs make transmissions 862 to other UE devices (e.g., UE device 'y' 504) without consideration of transmission to UE 'x' 502 (as cooperation has been terminated by a message or indication 866).

In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation.

In various embodiments, the cooperation for the UE device 'x' 502 is continued at cooperating APs (e.g., cooperating AP 'B' 508) based on the last feedback of cooperating information from the UE device 'x' 502 unless a feedback message is received to cancel the assignment reported by the UE device 'x' 502. In some embodiments, cooperating APs will time-out if they do not receive a feedback message to retain the assignment prior to timer expiry, where the timer will be more than one packet transmission opportunity from the initial assignment. In some embodiments, the serving AP 'A' 506 will indicate to the UE device 'x' 502 via DL control channel, or otherwise, whether another packet will follow the one currently in transmission. If another packet transmission is expected at the conclusion of the current packet transmission, the UE device 'x' 502 may continue requesting cooperation from cooperating APs (e.g., cooperating AP 'B' 508) by sending condition feedback or acknowledgements, as described in greater detail herein. If another packet transmission is not expected at the conclusion of the current packet transmission, the UE device 'x' 502 may send an indication to the cooperating APs to discontinue the cooperation. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

In various embodiments, a serving AP initiates a resource assignment to a UE device to ensure that there is no conflict in the resource assignment for at least that particular serving AP. The UE device then conveys aspects of this assignment and channel conditions to other, cooperating APs to establish and maintain cooperation of the resources. In one embodiment, the serving AP makes a resource assignment, R, to a UE device at some time $T_0$ for transmission to that UE device on those resources at some later time $T_T$. In another embodiment, the set of resources is based on feedback data from the UE device, which is received relatively infrequently. This feedback data is provided to ensure the UE device is not in a prolonged fade to shadowing, fading, or other such negative but slowly changing effects. If the small scale variations of the channel are changing very slowly due to slow motion of the UE device, scheduling according to desirable frequency channel conditions may be used by the serving AP. In yet another embodiment, the set of resources is not chosen in response to channel conditions observed by the UE device as none may be available. Instead, the set of resources is selected for ease of scheduling at the serving AP. Such selections may include scheduling of resources to avoid conflict with on-going assignments to avoid conflict with known usage of other APs.

As used herein, resources refer to a set of time-frequency radio resources related to a radio channel. In various embodiments, the resources in the set may be contiguous or non-contiguous in time or in frequency or in both, have different granularity, or be a combination of localized and distributed resources. In these and other embodiments, the initial resource assignment message is kept as small as possible to limit overhead and improve reception by the UE device. In one embodiment, the message contains UE device identification data and resources assignment data. In one embodiment, the resources are indicated by a message that is encoded by an identifier assigned to the UE device. A receiving UE device attempts to decode each received message until it successfully decodes the message intended for it. A cyclic redundancy check (CRC) can be used to verify correct decoding.

In various embodiments, a UE device-specific Physical Downlink Control Channel (PDCCH) is assigned to the UE Device operating in a cellular network, such as those implementing 3GPP LTE or LTE-A technologies. In these and other embodiments, the UE device specific PDCCH message contains only a resource identification. The UE device reads this message and uses the designated downlink resource to retrieve the data, and further control message if present. In another these various embodiments, some portion of the assigned downlink resource is reserved for these control messages. In certain embodiments, these initial assignment messages are sent on other resources, such as different carriers or different radio access technologies.

In some wireless environments, different APs may use radio resources for these messages that other nearby APs are not currently using. As an example, three different APs in an LTE environment may use one of three different Orthogonal Frequency-Division Multiplexing (OFDM) symbols to send these downlink control messages and not transmit on the other two. Furthermore, the assignment of such resources may be semi-static. In one embodiment, an AP will monitor transmissions over the air and will use a set of resources where it detects the least amount of activity in an attempt to avoid interference with other APs.

In various embodiments, the resource assignment may have an additional parameter to specify the starting subframe of the assignment. By specifying the subframe or some other time parameter of the assignment, the assignments can be grouped and sent together less frequently. For example, the assignment for an entire frame may be sent in a single subframe. The method of indicating the starting time of the assignment can be specified explicitly, or implicitly, by its order or location in the list of assignment messages.

In some embodiments, the initial resource assignment message contains a mechanism to identify the UE device and to identify the resources assigned to it. In some variants of this embodiment, an additional control message may be sent along with the data in the assigned resources. In at least one of these embodiments, additional part of the initial resource assignment message indicates a parameter (modulation, coding, size, etc.) of the control message that may be sent in the assigned resource along with data. In this embodiment, the control message is sent in a predetermined location, but not necessarily contiguously, of the resource assignment, for example, in the beginning of the resource block. In other embodiments, the additional part of the initial resource assignment message is a single bit indicating whether or not a control message is sent in the assigned resource along with data. In yet another embodiment, the additional part of the initial resource assignment message is a field of bits that indicates the quantized size of the control message sent in the assigned resource along with data. As an example, a 2-bit field could be used to indicate the control message size such as:

00—no message
01—size 1 (eg. 16 bits)
10—size 2 (eg 32 bits)
11—size 3 (eg. whole resource assignment is control message)

This embodiment allows for the UE device to have knowledge that a control message is present in the assigned resource, and also know its dimensions and location. In another embodiment, further changes to the size of the control messages, for example for the nth occurrence, is indicated in the control messages for the n−1 occurrence. Those of skill in the art will recognize that many such examples are possible and the foregoing is not intended to limit the spirit, scope or intent of the disclosure.

In one embodiment, the AP assigns resources to the UE devices in its serving area. The resource size can be adapted from parameters of packet size to be transmitted, as well as scheduling and priority considerations of other UE devices also being scheduled. In another embodiment, the DL signal-to-noise ratio (SNR) corresponding to the UE device is available to the serving AP prior to resource assignment scheduling. In this embodiment, the resource set R is selected such that a packet of size S can be transmitted successfully given the estimated SNR of the channel and a quality of service (QoS) constraint, such as the number of transmissions or the residual frame error rate. In yet another embodiment, the SNR is unknown or unreliable and the resource set R is selected using the packet size P and mean modulation and coding scheme (MCS) of the system. In certain embodiments, the SNR experienced by the UE device in each resource may be unknown or unreliable as the UE device has not provided feedback on each resource or set of resource to an AP at time $T_1$.

In various embodiments, HARQ is used in the transmission of a packet such that further HARQ attempts can be made if the initial transmission is unsuccessful. In certain embodiments, incremental redundancy (IR) is used as the form of HARQ in order to change the effective coding rate and modulation scheme with each HARQ transmission. In one embodiment, the resources selected may assume that n transmissions of the packet will be needed. In this embodiment, the size of the resource set |R| is replaced by n|R|. The MCS is then determined from the estimated SNR and the packet size P described in previous embodiments, such that the resource size is now n|R|. In those cases where the SNR is unknown or unreliable, the packet is then transmitted on |R| resources in each transmission according to IR-HARQ. The HARQ process may be terminated early if a positive acknowledgement is received prior to the next transmission as in conventional HARQ schemes. This approach allows for aggressive MCS selection to minimize the number of resources allocated per transmission in case one or more transmissions has a higher SNR than expected.

In one embodiment, the UE device may be provided with a dedicated control channel in the resources assigned for data transmission. In this embodiment, the control channel benefits from the same inter-AP cooperation or channel adaptation as the data transmission. Likewise. the control channel may carry additional information useful for decoding the data such modulation, multiple input/multiple output (MIMO) format, power level, etc. In another embodiment, the control channel transmission may be encoded differently from the data transmission (e.g. different modulation, MIMO format, power level, etc.). One approach for identifying the presence and size of the in-band control channel is to provide an indication in the initial resource assignment.

In yet another embodiment, the MIMO mode is not specifically indicated due to the use of dedicated reference signals in which the reference signals are modulated with the same MIMO mode, or modes, as the data streams. In this embodiment, there may be one set of dedicated reference signals per MIMO layer of data stream. In various embodiments, the control channel is coded separately from the data such that it can be decoded prior to attempting to decode the data. In one embodiment, the control channel is sent with the first HARQ transmission of the data only.

In various embodiments, the feedback generated by UE devices using this type of assignment is limited to the assigned resources, thereby eliminating signaling overhead related to feedback for multiple sub-band options. In these and other embodiments, the feedback contains information about the channel conditions observed at the UE device and may include power, SNR, spatial, directions or other information. The information may be quantized, for example, using spatial precoding vectors to represent the best signaling dimension, or dimensions in MIMO space. In some embodiments, the signal strength is measured at UE devices from the set of cooperating APs including the serving AP. The signal strength is measured from pilot symbols, reference signals, etc. The UE device determines the appropriate format of the signal that would provide the highest gain at the UE device.

In various embodiments, the set of resources may consist of several disjoint resource blocks. In these and other embodiments, it may be beneficial to provide feedback on the channel conditions of each of these blocks. For example, the spatial adaption in one resource block may be different from another resource block so information on both can be fed back. In one embodiment, the set of resources assigned to the UE device are known so it is possible for the UE device to simply provide a list of the channel parameters according to an ordering known to the AP and UE device such that specific resource indexing is not required in the feedback. Likewise, the feedback message can be timed to occur immediately prior to the DL transmissions such that both the channel state information delay and the amount of feedback is minimized. As an example, feedback could be timed such that the delay between $T_1$ and $T_T$ is minimized. However, this approach is not possible in systems where the resource assignment time is unknown in advance. In one embodiment, the AP sends mobile-specific DL reference signals within the set of resources for channel condition estimation/adaption. The reference signal patterns, density, precoding/configuration can be tailored or even omitted to the UE device. In another embodiment, conventional midambles or common reference signals can be used such that many or all mobile stations can use the one set of reference signals for channel estimation.

In various embodiments, the UE device sends different message on the UL to different APs. In these various embodiments, the UE device sends the desired precoding vector, or MIMO channel information, to the serving AP. The UE device also sends the precoding vector, or MIMO channel information, to avoid using to each of the APs in the cooperating set. In various embodiments, the desired and avoided MIMO information sent may refer to one or more precoding vectors, portion of a precoding matrix, or matrix indices.

In one embodiment, the MIMO channel information sent to each AP is simply a quantized or otherwise sampled version of the MIMO channel received at the UE device from each AP. As an example, the UE device sends MIMO channel information related to the signal received from AP-1 to AP-1, and MIMO channel information related to AP-2 to AP-2, and so forth.

In one embodiment, the UE device sends the feedback indicating the best spatial vector, or other transmission parameter such as directional vector, spreading sequence set, etc., such that the receiving AP is aware of the transmission parameters that would cause the greatest, or least, interference. Subsequently, the cooperating APs may use such information in interference avoidance as described in greater detail herein. In another embodiment, the UE device sends the feedback to each of the APs in the cooperating set indicating the spatial vector, or other transmission parameter such as directional vector, spreading sequence set, etc., that would create the greatest amount of interference to the desired signal from the serving AP. The estimate of the transmission parameters expected from the serving AP is based on UE device's feedback to the serving AP.

In various embodiments, a feedback channel is assigned to the UE device at the time the set of data channel resources is assigned. In certain of these embodiments the data channel resource assignment indicates which of the available UL resources are to be used as a feedback channel. In various embodiments, if a UE device is assigned multiple resources blocks, a feedback channel is assigned to each resource block and the data channel resource block assignment implies which of the available UL resources are to be used as a feedback channel within that block. In various other embodiments, the UL assignment message either accompanies or follows the resource assignment from the serving AP. For example, after the initial resource assignment, the first message transmitted on the assigned DL resources is, or includes, a control message for the assignment of UL feedback resources. In these various embodiments, the assignment of resources for the UL feedback for the UE device can be reoccurring, such that it occurs prior to each of the DL resource assignments. Assigning UL resources for feedback immediately prior to the DL resource assignment minimizes the error due to time delay of the channel condition feedback. In one embodiment, the parameters of the UL feedback message, such as scrambling sequence and spreading sequence, may be assigned to the UE device when it registers with the serving AP. In another embodiment, further details of UL feedback such as the particular resource are indicated according to one of the other embodiments. In another embodiment, the UE device may also receive such information when and if it registers with a cooperating AP other than the serving AP.

In various embodiments, feedback messages to different APs are sent in different subframes to minimize the effect of power limitations. In one embodiment, the transmission can be ordered according to the level of interference in order to minimize feedback delay and provide the most accurate channel state information. For example, the feedback to the serving AP is the available subframe with the minimum delay prior to data transmission, but allowing time for processing prior to transmission. The next earlier feedback transmission opportunity is used to transmit to the strongest interferer, and the opportunity before that is used to transmit to the second strongest interferer, and so forth. In another embodiment, the transmission can be ordered according to level of interference in order to maximize the time available to (re-)schedule the use of resources. For example, the feedback to the strongest interferer is in the first available subframe. The next feedback transmission opportunity is used to transmit to the second strongest interferer, and so forth.

In various embodiments, the UE device communicates with other APs in order to provide information for cooperation and interference avoidance. In these various embodiments, initial authentication or registration with the cooperating APs occurs through normal means of initial access for cellular or other communication systems that involve signaling over a random access or control channel. Alternatively, authentication can be provided during the UL feedback message to cooperating APs through a token provided by the serving AP.

In various embodiments, cooperation for a UE device is continued at the cooperating APs as long as some indication is received from the UE device prior to each transmission. In embodiments where the observed conditions are fed back for each transmission, the cooperation occurs according to each feedback signal received and does not occur when a feedback signal is not received from the UE device. In these embodiments, the cooperation is on a per-transmission basis. In other embodiments where the cooperating conditions allow for less frequent feedback, or only require an initial cooperating feedback signal, the cooperation may be renewed for another transmission occurrence by means of sending an indication, such as a positive acknowledgement to one or more cooperating APs.

In various embodiments, an AP will transmit to the UE devices it has assigned resources and will likewise try to avoid or jointly transmit to other UE devices based on feedback messages it receives. In certain embodiments implementing interference avoidance, the AP has assigned a set of resources to a UE device and has likewise received UL message from the UE device indicating its best spatial parameter, direction, or other transmission parameter. In these embodiments, the AP also receives message from other UE devices indicating the spatial parameter, direction, or other transmission parameter in order to avoid interference to the UE device. Accordingly, the AP applies a priority weighting to each of these to determine the final transmission format. In these and other embodiments, transmission parameters may can include:

Code (e.g. CDMA spreading code, MIMO spatial stream matrix

Space (e.g. geophysical location, antenna beam, angle of arrival/departure, and power In one embodiment, the transmission vector to a UE device served by the AP in the signaling space is given by $v_1$ which refers to a direction and magnitude, or equivalently coordinates, in the MIMO signal space. The AP receives or determines a vector from a UE device requesting avoidance of interference along the vector $v_2$. The resulting transmit vector is a weighted combination of $v_1$ and a the nearest vector to $v_1$ that is orthogonal to $v_2$. If a second request for interference avoidance is received or determined along $v_3$, the transmit vector is selected to be the weighted combination of the three vectors, $v_1$, a the nearest vector to $v_1$ that is orthogonal to $v_2$, and the nearest vector to $v_1$ that is orthogonal to $v_3$. In this embodiment, the weights are dependent upon prioritization according to other embodiments. As an example, the weights may be 0.5 for vector $v_1$, and 0.5 for the sum of all other interference avoidance vectors when uniformly applied. In another example of weight assignment, the weights are proportional to the power of the estimated received signal power at the UE device, or as a further estimate, the weights are proportional to the estimated SNR reported from the UE devices with these spatial parameters.

In another embodiment, directional multiplexing using physical beam forming, or beam steering, is implemented and the transmission vector of the UE device served by the AP in the signaling space is given by $v_1$, which refers to a magnitude and direction, or equivalently cooperates, from the AP to the UE device. The AP receives or determines a vector from a UE device requesting avoidance of interference along the vector $v_2$. In this embodiment, the resulting transmit vector from the AP would be a weighted combination of $v_1$ and the nearest vector to $v_1$ that is orthogonal, or has a signal $X_{the}$ dB lower in signal power than the direction of $v_2$. If a second request for interference avoidance is received or determined along $v_3$, the transmit vector is selected to be the weighted combination of the three vectors, $v_1$, the nearest vector to $v_1$ that is orthogonal, or has a signal $X_{th}$ dB lower in signal power than the direction of $v_2$, and the nearest vector to $v_1$ that is orthogonal, or has a signal $X_{th}$ dB lower in signal power than the direction of $v_3$. An example value for $X_{th}$ is 20 dB. The weights are dependent on prioritization according to other embodiments. In one example, the weights are 0.5 for vector $v_1$, and 0.5 for the sum of all other interference avoidance vectors when uniformly applied. In another embodiment, the weights are proportional to the power of the estimated received signal power at the UE device, or as an further estimate, the weights are proportional to the estimated SNR reported from the UE devices with these spatial parameters.

In one embodiment, the interference is signaled by reference signals such that the AP receives only a composite vector of interference, which is treated as a single UE device. In various embodiments, additional parameters are included in calculation of the weights for determining the final transmission vector. These additional parameters may include one or more of:

A HARQ priority, where the priority of a transmission relative to other transmissions is increased with the increasing index of the HARQ transmission for a packet. In various embodiments, the weights for both the UE device served by the AP and UE devices avoided by the AP are adjusted by the factor associated with the HARQ transmission index of the respective PHY packets. In one embodiment, the AP may only have knowledge of the served UE devices HARQ index, or will consider only this number, in which case the other UE devices are assumed to have a default factor, such as:

- an application type priority, where the application can be used to apply a factor to the weighting in order to give priority to time sensitive applications such voice over IP (VoIP) and streaming data over less time sensitive applications such as file downloads.
- a buffer status priority, where the priority assigned to the UE device being served increases as the queue of packets destined for the UE device at the AP increases in size.
- a transmission conditions-dependent priority, where the priority factor is increased relative to the priority for the interference avoidance priorities is used when the channel conditions to transmit to a UE device being served by the AP is better than average. Likewise, the priority factor is decreased relative to the priority for the interference avoidance when the channel conditions to transmit to a UE device being served by the AP is lower than average.

In various embodiments, one UE device is served in each resource set by the AP. In these and other embodiments, the AP may serve multiple UE devices opportunistically by spatial multiplexing, or multiplexing through other transmission parameters.

In various embodiments, resource allocation precedes transmission, and it is therefore possible for PHY-layer packet transmission to be completed such that the assigned set of resources is not required by UE device any longer. In these embodiments, the AP may not have time to re-assign the resources several subframes in advance. In certain of these embodiments, other conventional scheduling mechanisms that do not require pre-allocation of resources can be used. In certain other of these embodiments, other scheduling methods can be used in concert with the resource assignment approaches described in greater detail herein.

In one embodiment, the initial resource assignment to a UE device, which may be initiated by either the UE device or the AP, is used for all HARQ transmissions. In this embodiment, the resource assignment has an associated period such that further assignment messages are not required for HARQ transmissions. The periodic interval of the of the resources assignment is configurable. In one embodiment, the period of the resource assignment corresponds to the interval required between UE device-acknowledged HARQ transmissions. In another embodiment, the resource allocation is used for all HARQ transmissions and subsequent new packet transmissions to the UE device. In this embodiment, the allocation is valid until it is explicitly cancelled by the AP or UE device. In yet another embodiment, the allocation may expire after some period of time or number of unsuccessful transmissions.

In one embodiment, the set of resources assigned to a UE device changes according to an AP-specific hopping sequence so that the resources used change with each HARQ transmission, and do so in different pattern that UE devices being served by adjacent APs. Accordingly, repeated conflicts between the same set of mobile stations on resources being served by different APs is minimized. In various embodiments, the hopping patterns may not be globally unique, but probabilistically different for a local set of APs either through planning different sequences or pseudo-random assignment from a set of possible sequences. In various embodiments, the designation of the AP-specific pattern may be according to all, or a portion of, the AP identifiers. For example, in some embodiments, the interval between HARQ transmissions may be different for each AP in the cooperation set in an attempt to avoid collisions during retransmission. As another example, in some embodiments, the value of the interval between HARQ transmissions may be changed in a predetermined, and AP-specific, manner with each retransmission in an attempt to avoid repeated collisions during retransmission. Likewise, in embodiments where resources or timing is changed for HARQ transmissions and the cooperating AP is required to maintain some cooperation information, the AP is made aware of the UE device's serving AP such that it derive the appropriate HARQ resource and/or timing pattern.

In various embodiments, the downlink subframes may not be synchronized between APs due to lack of a common reference signal or GPS or due to their connection to different networks or administrative domains. This can lead to the case where a single subframe from one AP overlaps with portions of 2 subframes from other APs. In some embodiments, the process may be extended such that the AP may assign resources while avoiding transmitting interference to mobiles over both subframes. In various embodiments, the AP uses multiplexing to avoid interference and can likewise utilize radio access technology (RAT) invariant techniques, such as physical beamforming, power levels, etc. In certain of these embodiments, it is possible to use the methods described to allow inter-AP cooperation in the case of multiple RATs. In such embodiments, the UL messages from the UE device are transmitted to each AP using the AP's RAT, or alternatively, using a RAT format specified for this type of UL communication and cooperation.

Figure 9:
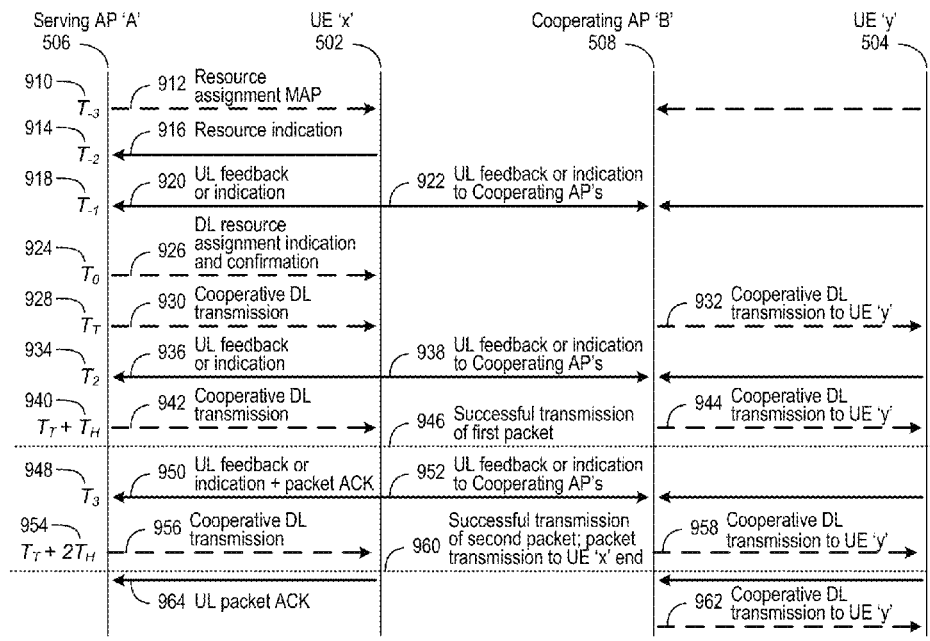
FIG. 9 shows a process signal flow for UE device-empowered RRM from a serving AP with UE device-initiated HARQ/periodic assignments with UL feedback or indication per transmission to cooperating APs as implemented with radio resource map.
Figure 10:
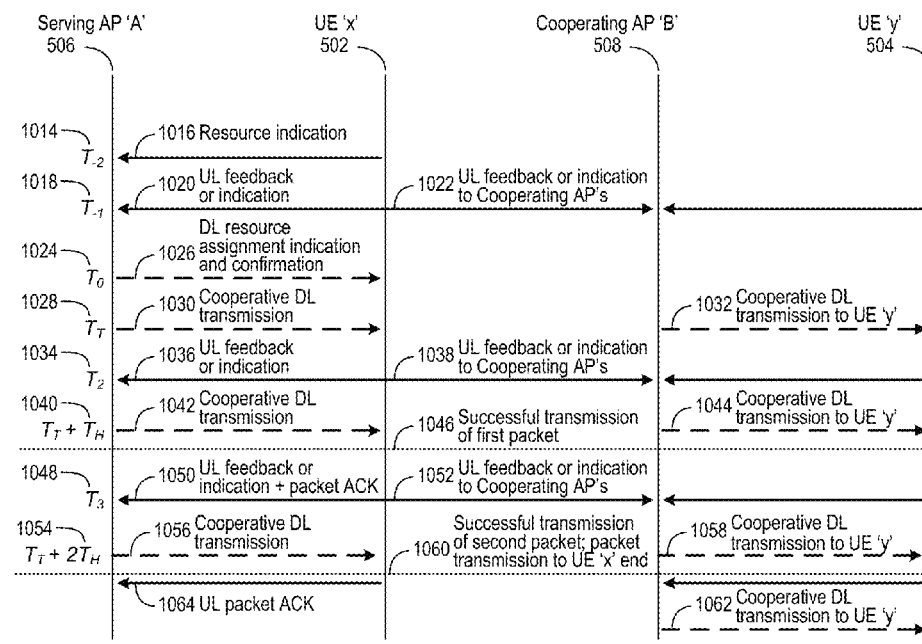
FIG. 10 shows a process signal flow for UE device-empowered RRM from a serving AP with UE device-initiated HARQ/periodic assignments with UL feedback or indication per transmission to cooperating APs as implemented without radio resource map.

In various embodiments, the UE device will undergo a change in its serving AP which herein is referred to as a handover, which is not used in embodiments where the serving AP is dynamically selected by the UE device. In these various embodiments, the change in serving AP, where AP 'A' is the current serving AP and AP 'B' is the target AP, the handover is executed according to the steps described in the following embodiment:

1. At some in time $T_{-2}$, a resource assignment map is transmitted, indicating resources that have been assigned by the AP for the time $T_T$. Alternatively, the radio assignment map may indicate which resources are available for assignment at time $T_T$.
   a. A resource map of assigned resource may be sent each subframe, or grouped and sent once every m subframesb. In some embodiments, the map is not transmitted
2. At some time $T_{-1}$, the UE device sends a handover indication to the target AP (e.g., AP 'B') a. In some embodiments a resource or set of resource may be selected and specified in the indication to the target AP i. where the channel conditions or other transmission parameters, such as beamforming direction, spatial adaption, and so forth, change slowly relative to the allocation process, these can be used as part of the selection procedure to determine the resources with the best conditions for transmission ii. in one embodiment, the UE device requests the same set of resources that it is current receiving communications from AP 'A' forward iii. in embodiments where the map is not transmitted from the AP, or when it is not available, the UE device selects resources in the target AP based on channel conditions or perceived activity and interference on the requested resources iv. in some embodiments, the UE device observes resource maps from one or more APs to determine which resources are free at the target AP, and less likely to have interference from other Aps b. An indication is sent to the target AP for service that includes an identification of the UE device i. in certain embodiments, the transmission may include requested resources, or, be an ordered list of the best resources from the UE device's perspective ii. in certain other embodiments, the indication to the target AP may include additional information from the old serving AP (e.g., AP 'A') to facilitate communication handover and/or authentication and billing 3. At some time $T_0$, the request to the target AP is acknowledged by a transmission to the UE device from the target AP a. In some embodiments, the target AP may allocate uplink resources to the UE device for further communication of the UE device's identity, requirements and capabilities b. In some embodiments, the UE device may send an indication to AP-1 that it longer requires resources assigned i. in one embodiment, the UE device indicates to AP 'A' that it has handed over to AP 'B' ii. in another embodiment, the UE device indicates to AP 'A' that it has handed over to AP 'B' on a particular set of resources, and may be sending interference avoidance requests at a later time 4. At some time $T_1$ the new serving AP (e.g., AP 'B') schedules the UE device (UE device 'x') on a set of radio resources of time frequency dimensions, R, at time $T_T > T_0$. This is the initial resource assignment a. In certain embodiments, this indication may be transmitted at the same time, or even in a joint message, with the acknowledgement sent by the target AP at time $T_0$ b. Resource assignment then proceeds as described in greater detail herein FIG. 9 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented with radio resource map, UL resource request at time $T_{-2}$ 914, UL feedback message at $T_{-1}$ 918, and downlink (DL) resource indication and confirmation sent prior to transmission at time $T_0 < T_T$. In this and other embodiments, radio resource assignment can be selected by the UE device 'x' 502, which may also select the serving AP 'A' 506 along with the radio resource assignment.

In some embodiments at some time $T_3$, 910, a radio resource map is transmitted indicating radio resources that have been made available to the UE device 'x' 502 by the serving AP 'A' 506 for the time $T_T$ 928. In these and other embodiments, a resource map of available resources is sent 912 with each subframe, or grouped and sent once every m subframes. Alternatively, the radio resource map 912 may indicate which resources are not available. Likewise, the map may not be transmitted, sent to one UE device (e.g., UE device 'x' 502), sent to a predetermined group of UE devices, or broadcast to all UE devices served by the serving AP 'A' 506.

At some time $T_{-2}$ 914, the UE device 'x' 502 observes resource maps from multiple APs (e.g., serving AP 'A' 506) and selects a radio resource or set of radio resources and sends an indication 916 of the selected resources to the serving AP 'A' 506. In various embodiments, the UE device 'x' 502 selects one or more APs that it wants to use as its serving AP (e.g., serving AP 'A' 506). In one embodiment, the activation of these actions at time $T_{-2}$ 914 is in response to receiving an indication 916 of impending downlink transmission from one or more APs at a time before $T_{-2}$ 914. In another embodiment, the channel conditions or other transmission parameters, such as beamforming direction, spatial adaption, etc. change slowly relative to the allocation process. In this embodiment, these channel conditions are used as part of the selection procedure to determine the radio resources with the best conditions for transmission. In another embodiment, the selection message or indication can be combined with the cooperation information signaling sent 922 to the serving AP 'A' 506 at $T_{-1}$ 918.

In various embodiments, the map is not transmitted 912 from the serving AP 'A' 506, or it is not available, and the UE device 'x' 502 selects radio resources based on channel conditions or perceived activity and interference on each resource block. In this embodiment, the UE device 'x' 502 selects the radio resource(s) with the lowest perceived activity or interference. Likewise, an indication 916 is sent to the serving AP(s) (e.g., serving AP 'A' 506) for the requested radio resource(s) and the transmission may comprise an ordered list of the preferred radio resource(s).

At some time $T_{-1}$ 918, where $T_{-2} < T_{-1} < T_T$, the UE device 'x' 502 transmits 920 a feedback message or other indication 922 to the one or more cooperating APs (e.g., cooperating AP 'B' 508), including the serving AP 'A' 506 on the UL. This allows the UE device 'x' 502 to provide cooperation information to all APs based on observed conditions at the UE device 'x' 502 for resources in the selection request. In some embodiments, this feedback message is sent some time after the resource request at time $T_{-2}$, 914 but just prior to $T_T$ 928 in order to lessen the delay between condition feedback and transmission.

At some time $T_0$ 924, the serving AP 'A' 506 schedules the use of a radio resource for the UE device 'x' 502 of time frequency dimensions, R, at time $T_T > T_0$. This is the initial radio resource assignment and in various embodiments, this assignment is indicated 926 to the UE device 'x' 502 at some time $T_0$ 924 prior to the first transmission $T_T$ 928 and in some embodiments, stays in effect for n subsequent transmission times. In one embodiment, the indication or confirmation 926 of the assignment or the radio resource to the UE device 'x' 502 may occur anytime before and including time $T_T$ 928. In another embodiment, the UE device 'x' 502 monitors the time frequency resources that it requested and the confirmation or other assignment parameters are transmitted within those resources.

In another embodiment, the assignment is not further indicated to the UE device 'x' 502 at time $T_0$ 924. However, the UE device 'x' 502 monitors and decodes the time frequency resources that it requested with the assumption its data has been transmitted on those radio resources. Successful or unsuccessful decoding of the data after one or more HARQ transmission will confirm or refute that the radio resources have been assigned to the UE device 'x' 502. In various embodiments, the assignment applies for all transmissions, whether they are HARQ transmissions or transmission of a new packet, at time, $T_T$ 928 and subsequent time $T_T+nT_H$, (e.g., $T_T+2T_H$ 954) where $T_H$ is the interval between HARQ transmissions. In these and other embodiments, the value of $T_H$ may be different for each AP in the cooperation set in an attempt to avoid collisions during retransmission. In various embodiments, the value of $T_H$ may be changed in a predetermined, and AP-specific, manner with each retransmission in an attempt to avoid repeated collisions during retransmission.

At some time $T_T$ 928, the serving AP 'A' 506 transmits 930 to the UE device 'x' 502 on radio resource R using feedback information optionally provided by the UE device 'x' 502. The other members of the cooperating set of APs may also transmit 932 to other UE devices (e.g., UE device 'y' 504), taking into account channel and other information transmitted by the UE device 'x' 502 at time $T_{-1}$ 918 for cooperation.

At some time $T_2$ 934, where $T_T<T_2<T_T+T_H$, the UE device 'x' 502 transmits a feedback message 936 or other indication to the one or more cooperating APs, and to the serving AP, on the UL. In some embodiments, the feedback message 936 allows the UE device 'x' 502 to provide cooperation information 938 to the serving and cooperating APs (e.g., cooperating AP 'B' 508) based on observed conditions at the UE device 'x' 502. In other embodiments, the feedback message 936 serves as an indication to serving and cooperating APs that the resource is still in use either for a HARQ retransmission or for a new packet transmission. In still further embodiments, the feedback message 936 provides both functions of resource utilization and observed condition update. In some embodiments, cooperation for UE device 'x' 502 is continued at cooperating APs (e.g., cooperating AP 'B' 508) as long some feedback indication 938 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 922 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T+T_H$ 940, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 944 to other UE devices (e.g., UE device 'y' 504), taking into account information transmitted by UE device 'x' 502 at time $T_2$ 934 for cooperation.

Assuming the packet is successfully received after two transmissions 946, at some time $T_3$ 948 where $T_T+T_H<T_3<T_T+2T_H$ the UE device 'x' 502 transmits a feedback message 950 or other indication to the one or more cooperating APs (e.g., cooperating AP 'B' 508), including the serving AP 'A' 506 on the UL that the packet has been successfully received, which may imply that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T+nT_H$ (e.g., $T_T+2T_H$ 954), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 958 to other UE devices (e.g., UE device 'y' 504), taking into account channel and other information transmitted by UE device 'x' 502 at time $T_3$ 948 for cooperation.

In some embodiments, several upcoming assignments or assignment maps may be sent in a single frame. For example, at time $T_t$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after transmission 960, the UE device 'x' 502 transmits a feedback message or other indication 964 to at least the serving AP 'A' 506 on the UL that the packet has been successfully received. In some embodiments, feedback or indications are not sent to the other members of the cooperating set of APs, and hence these AP's make transmissions 962 to other UE devices (e.g., UE device 'y' 504) without consideration of transmission to UE 'x' 502 as cooperation requires per transmission feedback in certain embodiments. In certain other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

Figure 12:
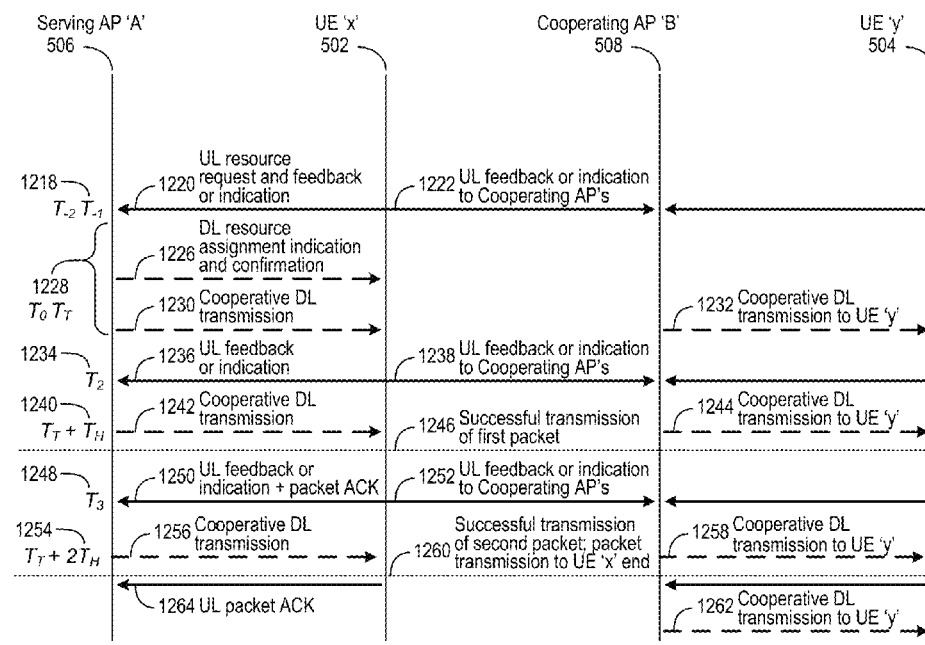
FIG. 12 shows a process signal flow for UE device-empowered RRM with UE device-initiated HARQ/periodic assignments with UL feedback or indication per transmission to cooperating APs as implemented without radio resource map and a combined UL resource request and feedback message.

FIG. 12 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented without radio resource map, UL resource request at time $T_{-2}$ 1014, UL feedback message at $T_{-1}$ 1018, and downlink (DL) resource indication and confirmation sent prior to transmission at time $T_0<T_T$.

At some time $T_{-2}$ 1014, the UE device 'x' 502 selects a radio resource or set of radio resources and sends an indication 1016 of the selected resources to the serving AP 'A' 506. In various embodiments, the UE device 'x' 502 selects one or more APs that it wants to use as its serving AP (e.g., serving AP 'A' 506). In one embodiment, the activation of these actions at time $T_{-2}$ 1014 is in response to receiving an indication 1016 of impending downlink transmission from one or more APs at a time before $T_{-2}$ 1014. In another embodiment, the channel conditions or other transmission parameters, such as beamforming direction, spatial adaption, etc. change slowly relative to the allocation process. In this embodiment, these channel conditions are used as part of the selection procedure to determine the radio resources with the best conditions for transmission. In another embodiment, the selection message or indication can be combined with the cooperation information signaling sent 1022 to the serving AP 'A' 506 at $T_{-1}$ 1018.

In various embodiments, the map is not transmitted 1012 from the serving AP 'A' 506, or it is not available, and the UE device 'x' 502 selects radio resources based on channel conditions or perceived activity and interference on each resource block. In this embodiment, the UE device 'x' 502 selects the radio resource(s) with the lowest perceived activity or interference. Likewise, an indication 1016 is sent to the serving AP(s) (e.g., serving AP 'A' 506) for the requested radio resource(s) and the transmission may comprise an ordered list of the preferred radio resource(s).

At some time $T_{-1}$ 1018, where $T_{-2}<T_{-1}<T_T$, the UE device 'x' 502 transmits 1020 a feedback message or other indication 1022 to the one or more cooperating APs (e.g., cooperating AP 'B' 508), including the serving AP 'A' 506 on the UL. This allows the UE device 'x' 502 to provide cooperation information to all APs based on observed conditions at the UE device 'x' 502 for resources in the selection request. In some embodiments, this feedback message is sent some time after the resource request at time $T_{-2}$, 1014 but just prior to $T_T$ 1028 in order to lessen the delay between condition feedback and transmission.

At some time $T_0$ 1024, the serving AP 'A' 506 schedules the use of a radio resource for the UE device 'x' 502 of time frequency dimensions, R, at time $T_T>T_0$. This is the initial radio resource assignment and in various embodiments, this assignment is indicated 1026 to the UE device 'x' 502 at some time $T_0$ 1024 prior to the first transmission $T_T$ 1028 and in some embodiments, stays in effect for n subsequent transmission times. In one embodiment, the indication or confirmation 1026 of the assignment or the radio resource to the UE device 'x' 502 may occur anytime before and including time $T_T$ 1028. In another embodiment, the UE device 'x' 502 monitors the time frequency resources that it requested and the confirmation or other assignment parameters are transmitted within those resources.

In another embodiment, the assignment is not further indicated to the UE device 'x' 502 at time $T_0$ 1024. However, the UE device 'x' 502 monitors and decodes the time frequency resources that it requested with the assumption its data has been transmitted on those radio resources. Successful or unsuccessful decoding of the data after one or more HARQ transmission will confirm or refute that the radio resources have been assigned to the UE device 'x' 502. In various embodiments, the assignment applies for all transmissions, whether they are HARQ transmissions or transmission of a new packet, at time, $T_T$ 1028 and subsequent time $T_T+nT_H$, (e.g., $T_T+2T_H$ 1054) where $T_H$ is the interval between HARQ transmissions. In these and other embodiments, the value of $T_H$ may be different for each AP in the cooperation set in an attempt to avoid collisions during retransmission. In various embodiments, the value of $T_H$ may be changed in a predetermined, and AP-specific, manner with each retransmission in an attempt to avoid repeated collisions during retransmission.

At some time $T_T$ 1028, the serving AP 'A' 506 transmits 1030 to the UE device 'x' 502 on radio resource R using feedback information optionally provided by the UE device 'x' 502. The other members of the cooperating set of APs may also transmit 1032 to other UE devices (e.g., UE device 'y' 504), taking into account channel and other information transmitted by the UE device 'x' 502 at time $T_{-1}$ 1018 for cooperation.

At some time $T_2$ 1034, where $T_T<T_2<T_T+T_H$, the UE device 'x' 502 transmits a feedback message 1036 or other indication to the one or more cooperating APs, and to the serving AP, on the UL. In some embodiments, the feedback message 1036 allows the UE device 'x' 502 to provide cooperation information 1038 to the serving and cooperating APs (e.g., cooperating AP 'B' 508) based on observed conditions at the UE device 'x' 502. In other embodiments, the feedback message 1036 serves as an indication to serving and cooperating APs that the resource is still in use either for a HARQ retransmission or for a new packet transmission. In still further embodiments, the feedback message 1036 provides both functions of resource utilization and observed condition update. In some embodiments, cooperation for UE device 'x' 502 is continued at cooperating APs (e.g., cooperating AP 'B' 508) as long some feedback indication 1038 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 1022 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T+T_H$ 1040, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 1044 to other UE devices (e.g., UE device 'y' 504), taking into account information transmitted by UE device 'x' 502 at time $T_2$ 1034 for cooperation. Assuming the packet is successfully received after two transmissions 1046, at some time $T_3$ 1048 where $T_T+T_H<T_3<T_T+2T_H$ the UE device 'x' 502 transmits a feedback message 1050 or other indication to the one or more cooperating APs (e.g., cooperating AP 'B' 508), including the serving AP 'A' 506 on the UL that the packet has been successfully received, which may imply that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T+nT_H$ (e.g., $T_T+2T_H$ 1054), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 1058 to other UE devices (e.g., UE device 'y' 504), taking into account channel and other information transmitted by UE device 'x' 502 at time $T_3$ 1048 for cooperation.

In some embodiments, several upcoming assignments or assignment maps may be sent in a single frame. For example, at time $T_t$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after transmission 1060, the UE device 'x' 502 transmits a feedback message or other indication 1064 to at least the serving AP 'A' 506 on the UL that the packet has been successfully received. In some embodiments, feedback or indications are not sent to the other members of the cooperating set of APs and hence, these AP's make transmissions 1062 to other UE devices (e.g., UE device 'y' 504) without consideration of transmission to UE 'x' 502 as cooperation requires per transmission feedback in certain embodiments. In certain other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T + nT_H$ timeslots.

Figure 11:
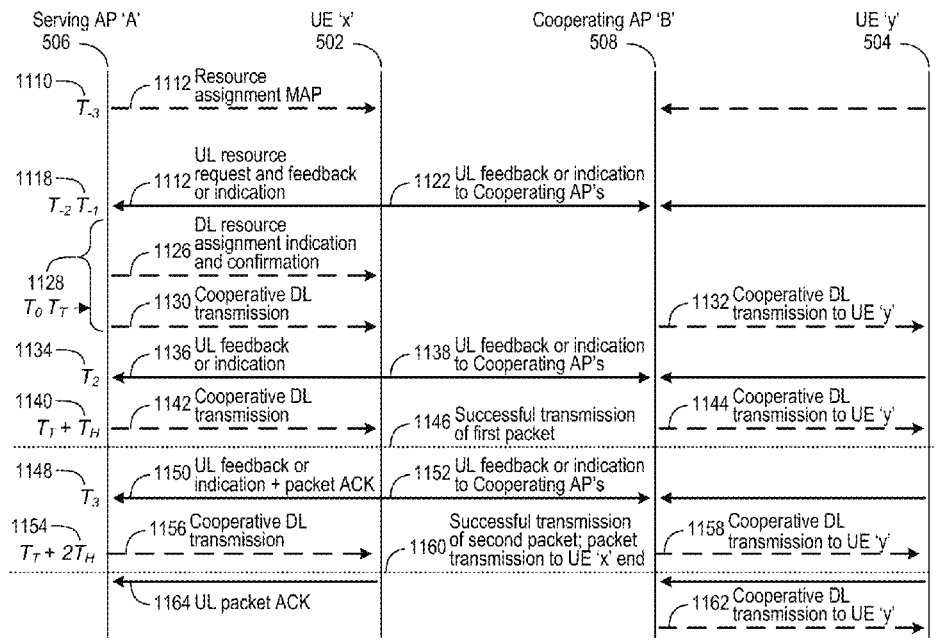
FIG. 11 shows a process signal flow for UE device-empowered RRM from a serving AP with UE device-initiated HARQ/periodic assignments with UL feedback or indication per transmission to cooperating APs as implemented with radio resource map and a combined UL resource request and feedback message.

FIG. 11 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented with radio resource map and a combined UL resource request and feedback message from the UE device 'x' 502 at time $T_{-2} = T_{-1}$ 1118 and DL resource indication and confirmation sent with transmission at time $T_0 = T_T$ 1128.

In some embodiments at some time $T_3$, 1110, a radio resource map is transmitted indicating radio resources that have been made available to the UE device 'x' 502 by the serving AP 'A' 506 for the time $T_0 = T_T$ 1128. In these and other embodiments, a resource map of available resources is sent 1112 with each subframe, or grouped and sent once every m subframes. Alternatively, the radio resource map 1112 may indicate which resources are not available. Likewise, the map may not be transmitted, sent to one UE device (e.g., UE device 'x' 502), sent to a predetermined group of UE devices, or broadcast to all UE devices served by the serving AP 'A' 506.

In this embodiment the UE device 'x' 502 transmits 1120 a combined UL radio resource request and feedback message or other indication 1122 to the one or more cooperating APs (e.g., cooperating AP 'B' 508), including the serving AP 'A' 506 on the UL at time $T_{-2} = T_{-1}$ 1118. This allows the UE device 'x' 502 to provide cooperation information to all APs based on observed conditions at the UE device 'x' 502 for resources in the selection request.

At some time $T_0 = T_T$ 1128, the serving AP 'A' 506 schedules the use of a radio resource for the UE device 'x' 502 of time frequency dimensions, R. This is the initial radio resource assignment and in various embodiments, this assignment is indicated 1126 to the UE device 'x' 502. Likewise, at some time $T_0 = T_T$ 1128, the serving AP 'A' 506 transmits 1130 to the UE device 'x' 502 on radio resource R using feedback information optionally provided by the UE device 'x' 502. The other members of the cooperating set of APs may also transmit 1132 to other UE devices (e.g., UE device 'y' 504), taking into account channel and other information transmitted by the UE device 'x' 502 at time $T_{-2} = T_{-1}$ 1118 for cooperation.

At some time $T_2$ 1134, the UE device 'x' 502 transmits a feedback message 1136 or other indication to the one or more cooperating APs, and to the serving AP, on the UL. In some embodiments, the feedback message 1136 allows the UE device 'x' 502 to provide cooperation information 1138 to the serving and cooperating APs (e.g., cooperating AP 'B' 508) based on observed conditions at the UE device 'x' 502. In other embodiments, the feedback message 1136 serves as an indication to serving and cooperating APs that the resource is still in use either for a HARQ retransmission or for a new packet transmission. In still further embodiments, the feedback message 1136 provides both functions of resource utilization and observed condition update. In some embodiments, cooperation for UE device 'x' 502 is continued at cooperating APs (e.g., cooperating AP 'B' 508) as long some feedback indication 1138 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 1122 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T + T_H$ 1140, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 1144 to other UE devices (e.g., UE device 'y' 504), taking into account information transmitted by UE device 'x' 502 at time $T_2$ 1134 for cooperation. Assuming the packet is successfully received after two transmissions 1146, at some time $T_3$ 1148, the UE device 'x' 502 transmits a feedback message 1150 or other indication to the one or more cooperating APs (e.g., cooperating AP 'B' 508), including the serving AP 'A' 506 on the UL the packet has been successfully received, which may imply that that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T + nT_H$ (e.g., $T_T + 2T_H$ 1154), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 1158 to other UE devices (e.g., UE device 'y' 504), taking into account channel and other information transmitted by UE device 'x' 502 at time $T_3$ 1148 for cooperation.

In some embodiments, several upcoming assignments or assignment maps may be sent in a single frame. For example, at time $T_f$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after transmission 1160, the UE device 'x' 502 transmits a feedback message or other indication 1164 to at least the serving AP 'A' 506 on the UL that the packet has been successfully received. In some embodiments, feedback or indications are not sent to the other members of the cooperating set of APs and hence, these AP's make transmissions 1162 to other UE devices (e.g., UE device 'y' 504) without consideration of transmission to UE 'x' 502, as cooperation requires per transmission feedback in at least some embodiments. In some other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

FIG. 12 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented without radio resource map and a combined UL resource request and feedback message from the UE device 'x' 502 at time $T_{-2}=T_{-1}$ 1218 and DL resource indication and confirmation sent with transmission at time $T_0=T_T$ 1228.

In this embodiment the UE device 'x' 502 transmits 1220 a combined UL radio resource request and feedback message or other indication 1222 to the one or more cooperating APs (e.g., cooperating AP 'B' 508), including the serving AP 'A' 506 on the UL at time $T_{-2}=T_{-1}$ 1218. This allows the UE device 'x' 502 to provide cooperation information to all APs based on observed conditions at the UE device 'x' 502 for resources in the selection request.

At some time $T_0=T_T$ 1228, the serving AP 'A' 506 schedules the use of a radio resource for the UE device 'x' 502 of time frequency dimensions, R. This is the initial radio resource assignment and in various embodiments, this assignment is indicated 1226 to the UE device 'x' 502. Likewise, at some time $T_0=T_T$ 1228, the serving AP 'A' 506 transmits 1230 to the UE device 'x' 502 on radio resource R using feedback information optionally provided by the UE device 'x' 502.

The other members of the cooperating set of APs may also transmit 1232 to other UE devices (e.g., UE device 'y' 504), taking into account channel and other information transmitted by the UE device 'x' 502 at time $T_{-2}=T_{-1}$ 1218 for cooperation.

At some time $T_2$ 1234, the UE device 'x' 502 transmits a feedback message 1236 or other indication to the one or more cooperating APs, and to the serving AP, on the UL. In some embodiments, the feedback message 1236 allows the UE device 'x' 502 to provide cooperation information 1238 to the serving and cooperating APs (e.g., cooperating AP 'B' 508) based on observed conditions at the UE device 'x' 502. In other embodiments, the feedback message 1236 serves as an indication to serving and cooperating APs that the resource is still in use either for a HARQ retransmission or for a new packet transmission. In still further embodiments, the feedback message 1236 provides both functions of resource utilization and observed condition update. In some embodiments, cooperation for UE device 'x' 502 is continued at cooperating APs (e.g., cooperating AP 'B' 508) as long some feedback indication 1238 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 1222 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T+T_H$ 1240, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 1244 to other UE devices (e.g., UE device 'y' 504), taking into account information transmitted by UE device 'x' 502 at time $T_2$ 1234 for cooperation. Assuming the packet is successfully received after two transmissions 1246, at some time $T_3$ 1248, the UE device 'x' 502 transmits a feedback message 1250 or other indication to the one or more cooperating APs (e.g., cooperating AP 'B' 508), including the serving AP 'A' 506 on the UL the packet has been successfully received, which may imply that that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T nT_H$ (e.g., $T_T+2T_H$ 1254), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 1258 to other UE devices (e.g., UE device 'y' 504), taking into account channel and other information transmitted by UE device 'x' 502 at time $T_3$ 1248 for cooperation.

In some embodiments, several upcoming assignments or assignment maps may be sent in a single frame. For example, at time $T_t$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after transmission 1260, the UE device 'x' 502 transmits a feedback message or other indication 1264 to at least the serving AP 'A' 506 on the UL that the packet has been successfully received. In some embodiments, feedback or indications are not sent to the other members of the cooperating set of APs and hence these AP's make transmissions 1262 to other UE devices (e.g., UE device 'y' 504) without consideration of transmission to UE 'x' 502 as cooperation requires per transmission feedback in certain embodiments. In certain other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T + nT_H$ timeslots.

Figure 13:
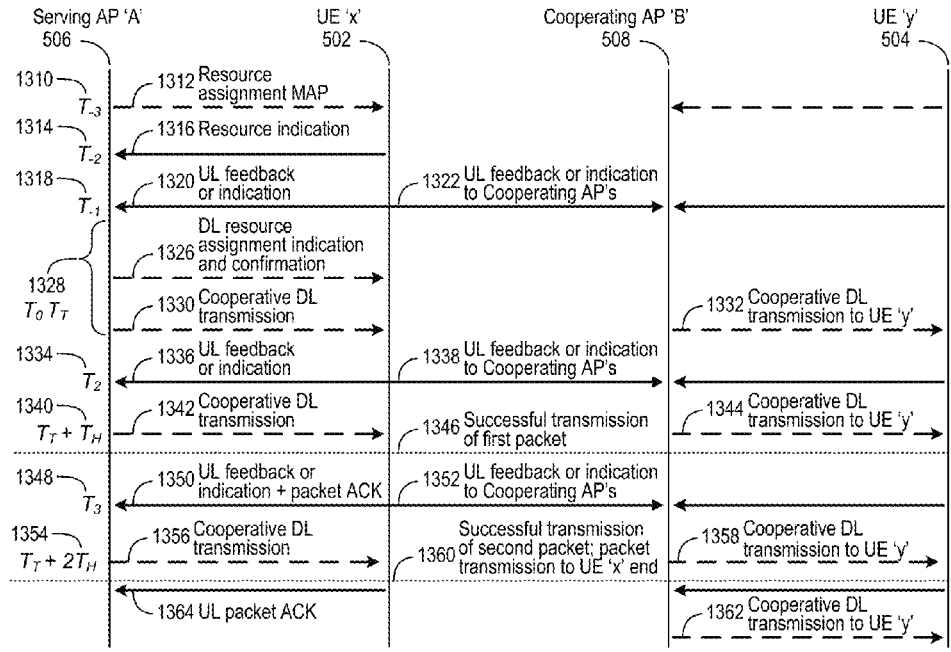
FIG. 13 shows a process signal flow for UE device-empowered RRM from a serving AP with UE device-initiated HARQ/periodic assignments with UL feedback or indication per transmission to cooperating APs as implemented with radio resource map and DL resource indication and confirmation sent with transmission at time $T_0 = T_T$.

FIG. 13 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented with radio resource map, UL resource request at time $T_{-2}$ 1314, UL feedback message at $T_{-1}$ 1318, and downlink (DL) resource indication and confirmation sent prior to transmission at time $T_0 = T_T$ 1328.

In some embodiments at some time $T_3$, 15101310, a radio resource map is transmitted indicating radio resources that have been made available to the UE device 'x' 502 by the serving AP 'A' 506 for the time $T_0 = T_T$ 1328. In these and other embodiments, a resource map of available resources is sent 1312 with each subframe, or grouped and sent once every m subframes. Alternatively, the radio resource map 1312 may indicate which resources are not available. Likewise, the map may not be transmitted, sent to one UE device (e.g., UE device 'x' 502), sent to a predetermined group of UE devices, or broadcast to all UE devices served by the serving AP 'A' 506.

At some time $T_{-2}$ 1314, the UE device 'x' 502 observes resource maps from multiple APs (e.g., serving AP 'A' 506) and selects a radio resource or set of radio resources and sends an indication 1316 of the selected resources to the serving AP 'A' 506. In various embodiments, the UE device 'x' 502 selects one or more APs that it wants to use as its serving AP (e.g., serving AP 'A' 506). In one embodiment, the activation of these actions at time $T_{-2}$ 1314 is in response to receiving an indication 1516 1316 of impending downlink transmission from one or more APs at a time before $T_{-2}$ 1314. In another embodiment, the channel conditions or other transmission parameters, such as beamforming direction, spatial adaption, etc. change slowly relative to the allocation process. In this embodiment, these channel conditions are used as part of the selection procedure to determine the radio resources with the best conditions for transmission. In another embodiment, the selection message or indication can be combined with the cooperation information signaling sent 1322 to the serving AP 'A' 506 at $T_{-1}$ 1318.

In various embodiments, the map is not transmitted 1312 from the serving AP 'A' 506, or it is not available, and the UE device 'x' 502 selects radio resources based on channel conditions or perceived activity and interference on each resource block. In this embodiment, the UE device 'x' 502 selects the radio resource(s) with the lowest perceived activity or interference. Likewise, an indication 1316 is sent to the serving AP(s) (e.g., serving AP 'A' 506) for the requested radio resource(s) and the transmission may comprise an ordered list of the preferred radio resource(s).

At some time $T_{-1}$ 1318, the UE device 'x' 502 transmits 1320 a feedback message or other indication 1322 to the one or more cooperating APs (e.g., cooperating AP 'B' 508), including the serving AP 'A' 506 on the UL. This allows the UE device 'x' 502 to provide cooperation information to all APs based on observed conditions at the UE device 'x' 502 for resources in the selection request. In some embodiments, this feedback message is sent some time after the resource request at time $T_{-2}$, 1314 but just prior to $T_0 = T_T$ 1328 in order to lessen the delay between condition feedback and transmission.

At some time $T_0 = T_T$ 1328, the serving AP 'A' 506 schedules the use of a radio resource for the UE device 'x' 502 of time frequency dimensions, R. This is the initial radio resource assignment and in various embodiments, this assignment is indicated 1326 to the UE device 'x' 502. Likewise, at some time $T_0 = T_T$ 1328, the serving AP 'A' 506 transmits 1330 to the UE device 'x' 502 on radio resource R using feedback information optionally provided by the UE device 'x' 502. The other members of the cooperating set of APs may also transmit 1332 to other UE devices (e.g., UE device 'y' 504), taking into account channel and other information transmitted by the UE device 'x' 502 at time $T_{-2} = T_{-1}$ 1318 for cooperation.

At some time $T_2$ 1334, the UE device 'x' 502 transmits a feedback message 1336 or other indication to the one or more cooperating APs, and to the serving AP, on the UL. In some embodiments, the feedback message 1336 allows the UE device 'x' 502 to provide cooperation information 1338 to the serving and cooperating APs (e.g., cooperating AP 'B' 508) based on observed conditions at the UE device 'x' 502. In other embodiments, the feedback message 1336 serves as an indication to serving and cooperating APs that the resource is still in use either for a HARQ retransmission or for a new packet transmission. In still further embodiments, the feedback message 1336 provides both functions of resource utilization and observed condition update. In some embodiments, cooperation for UE device 'x' 502 is continued at cooperating APs (e.g., cooperating AP 'B' 508) as long some feedback indication 1338 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 1322 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T+T_H$ 1540, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 1344 to other UE devices (e.g., UE device 'y' 504), taking into account information transmitted by UE device 'x' 502 at time $T_2$ 1334 for cooperation. Assuming the packet is successfully received after two transmissions 1346, at some time $T_3$ 1348, the UE device 'x' 502 transmits a feedback message 1350 or other indication to the one or more cooperating APs (e.g., cooperating AP 'B' 508), including the serving AP 'A' 506 on the UL the packet has been successfully received, which may imply that that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T+nT_H$ (e.g., $T_T+2T_H$ 1354), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 1358 to other UE devices (e.g., UE device 'y' 504), taking into account channel and other information transmitted by UE device 'x' 502 at time $T_3$ 1348 for cooperation.

In some embodiments, several upcoming assignments or assignment maps may be sent in a single frame. For example, at time $T_i$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after this transmission 1360, the UE device 'x' 502 transmits a feedback message or other indication 1364 to at least the serving AP 'A' 506 on the UL that the packet has been successfully received. In some embodiments, feedback or indications are not sent to the other members of the cooperating set of APs and hence these AP's make transmissions 1362 to other UE devices (e.g., UE device 'y' 504) without consideration of transmission to UE 'x' 502 as cooperation requires per transmission feedback in certain embodiments. In certain other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

Figure 14:
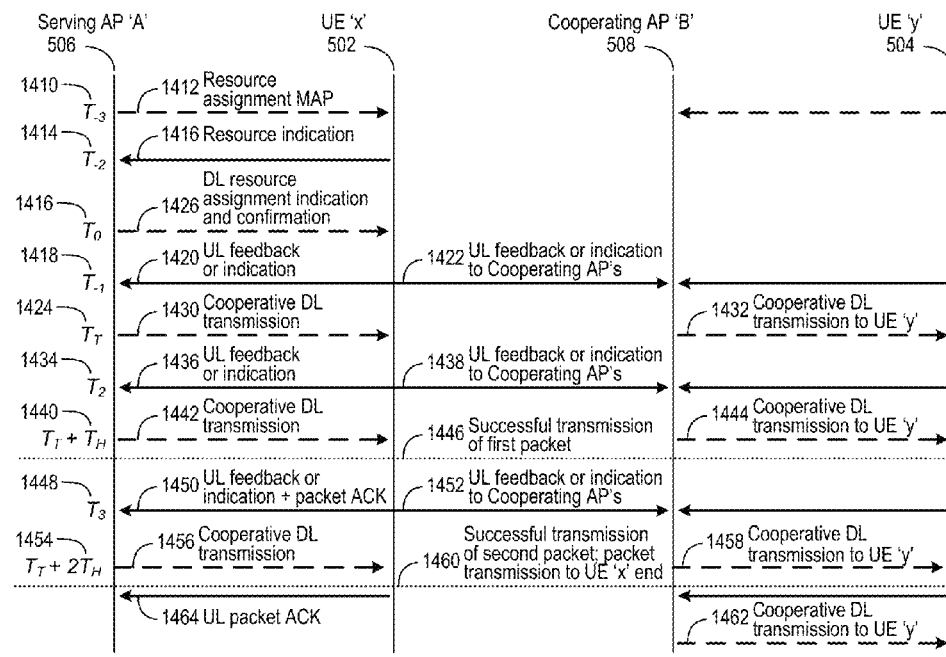
FIG. 14 shows a process signal flow for UE device-empowered RRM from a serving AP with UE device-initiated HARQ/periodic assignments with UL feedback or indication per transmission to cooperating APs as implemented with radio resource map and DL resource indication and confirmation sent prior to UL cooperation feedback at time $T_0 < T_{-1}$.

FIG. 14 shows a process signal flow for user-equipment-empowered radio resource management (RRM) from a serving access point with user equipment (UE) device-initiated hybrid automatic repeat request (HARQ)/periodic assignments with uplink (UL) feedback or indication per transmission to cooperating APs. In this embodiment, UE device-empowered RRM is implemented with radio resource map, UL resource request at time $T_2$ 1414, UL feedback message at $T_{-1}$ 1418, and downlink (DL) resource indication and confirmation sent prior to UL cooperation feedback at time $T_0<T_{-1}$.

In some embodiments at some time $T_3$, 1410, a radio resource map is transmitted indicating radio resources that have been made available to the UE device 'x' 502 by the serving AP 'A' 506 for the time $T_T$ 1424. In these and other embodiments, a resource map of available resources is sent 1412 with each subframe, or grouped and sent once every m subframes. Alternatively, the radio resource map 1412 may indicate which resources are not available. Likewise, the map may not be transmitted, sent to one UE device (e.g., UE device 'x' 502), sent to a predetermined group of UE devices, or broadcast to all UE devices served by the serving AP 'A' 506.

At some time $T_{-2}$ 1414, the UE device 'x' 502 observes resource maps from multiple APs (e.g., serving AP 'A' 506) and selects a radio resource or set of radio resources and sends an indication 1416 of the selected resources to the serving AP 'A' 506. In various embodiments, the UE device 'x' 502 selects one or more APs that it wants to use as its serving AP (e.g., serving AP 'A' 506). In one embodiment, the activation of these actions at time $T_{-2}$ 1414 is in response to receiving an indication 1416 of impending downlink transmission from one or more APs at a time before $T_{-2}$ 1414. In another embodiment, the channel conditions or other transmission parameters, such as beamforming direction, spatial adaption, etc. change slowly relative to the allocation process. In this embodiment, these channel conditions are used as part of the selection procedure to determine the radio resources with the best conditions for transmission. In another embodiment, the selection message or indication can be combined with the cooperation information signaling sent 1422 to the serving AP 'A' 506 at $T_{-1}$ 1418.

In various embodiments, the map is not transmitted 1412 from the serving AP 'A' 506, or it is not available, and the UE device 'x' 502 selects radio resources based on channel conditions or perceived activity and interference on each resource block. In this embodiment, the UE device 'x' 502 selects the radio resource(s) with the lowest perceived activity or interference. Likewise, an indication 1416 is sent to the serving AP(s) (e.g., serving AP 'A' 506) for the requested radio resource(s) and the transmission may comprise an ordered list of the preferred radio resource(s).

In various embodiments, an AP broadcasts a resource map indicating which radio resources have already been assigned for an upcoming scheduling opportunity or timeslot. In these and other embodiments, the radio resources that have been assigned in advance by an AP include those for UE device-assigned resources for multiple transmissions (e.g., HARQ) as described in greater detail herein. In various embodiments, the AP triggers the initiation of radio resource assignment by signaling a UE device of an impending downlink transmission. In these and other embodiments, the UE device sends a message to request a predetermined set of resources to a serving AP at approximately the same time it sends messages to other AP for interference cooperation as described in greater detail herein.

In some embodiments, the UE device can likewise select its serving AP by including this indication with a resource request to a target serving AP. In one embodiment, the messages are sent to different APs over a predetermined number of time slots to limit the impact of power consumption.

In some embodiments, the AP may serve more than one UE device on a given resource as a consequence of dynamically selecting serving APs for each resource based on UE device requests. In these embodiments, the AP may attempt to avoid interfering with other UE devices that have sent an interference avoidance message. In these and other embodiments, multiple UE devices served by the AP in the same radio resource through multiplexing of signals based on the signal dimensions available. In various embodiments, these signal dimensions may comprise code (e.g. CDMA spreading code, MIMO spatial stream matrix) and space (e.g. geophysical location, antenna beam, angle of arrival/departure, and power). Likewise, the aforementioned signaling dimensions are used for transmitting the signal to the UE device(s) being served while avoiding other UE devices.

In one embodiment, the assignment of radio resources is confirmed to the UE device by the serving AP transmitting an indication of the resource assignment at the same time, or before, the initial data transmission. In another embodiment, the resource assignment is confirmed to the UE device by the serving AP transmitting a control message intended only for a predetermined UE device, or by identifying the resource assignment at the same time, or before the initial data transmission. In yet another embodiment, the UE device waits until the radio resource assignment is confirmed or identified by the serving AP before sending UL feedback of conditions for cooperation to the serving and cooperating APs. In still another embodiment, the UE device may wait until the resource assignment is confirmed before sending UL feedback to cooperating APs.

Referring now to FIG. 14, at some time $T_0$ 1416, the serving AP 'A' 506 schedules the use of a radio resource for the UE device 'x' 502 of time frequency dimensions, R. This is the initial radio resource assignment and in various embodiments, this assignment is indicated 1426 to the UE device 'x' 502 at some time $T_0$ 1416 prior to the first transmission $T_T$ 1424 and in some embodiments, stays in effect for n subsequent transmission times. In one embodiment, the indication or confirmation 1426 of the assignment or the radio resource to the UE device 'x' 502 may occur anytime before and including time $T_T$ 1424. In another embodiment, the UE device 'x' 502 monitors the time frequency resources that it requested and the confirmation or other assignment parameters are transmitted within those resources.

In another embodiment, the assignment is not further indicated to the UE device 'x' 502 at time $T_0$ 1416. However, the UE device 'x' 502 monitors and decodes the time frequency resources that it requested with the assumption its data has been transmitted on those radio resources. Successful or unsuccessful decoding of the data after one or more HARQ transmission will confirm or refute that the radio resources have been assigned to the UE device 'x' 502. In various embodiments, the assignment applies for all transmissions, whether they are HARQ transmissions or transmission of a new packet, at time, $T_T$ 1424 and subsequent time $T_T+nT_H$, (e.g., $T_T+2T_H$ 1454) where $T_H$ is the interval between HARQ transmissions. In these and other embodiments, the value of $T_H$ may be different for each AP in the cooperation set in an attempt to avoid collisions during retransmission. In various embodiments, the value of $T_H$ may be changed in a predetermined, and AP-specific, manner with each retransmission in an attempt to avoid repeated collisions during retransmission.

At some time $T_{-1}$ 1418, the UE device 'x' 502 transmits 1420 a feedback message or other indication 1622 to the one or more cooperating APs (e.g., cooperating AP 'B' 508), including the serving AP 'A' 506 on the UL. This allows the UE device 'x' 502 to provide cooperation information to all APs based on observed conditions at the UE device 'x' 502 for resources in the selection request. In some embodiments, this feedback message is sent some time after the resource request at time $T_{-2}$, 1414 but just prior to $T_T$ 1424 in order to lessen the delay between condition feedback and transmission.

At some time $T_T$ 1424, the serving AP 'A' 506 transmits 1430 to the UE device 'x' 502 on radio resource R using feedback information optionally provided by the UE device 'x' 502. The other members of the cooperating set of APs may also transmit 1432 to other UE devices (e.g., UE device 'y' 504), taking into account channel and other information transmitted by the UE device 'x' 502 at time $T_{-1}$ 1418 for cooperation.

At some time $T_2$ 1434, the UE device 'x' 502 transmits a feedback message 1436 or other indication to the one or more cooperating APs, and to the serving AP, on the UL. In some embodiments, the feedback message 1436 allows the UE device 'x' 502 to provide cooperation information 1438 to the serving and cooperating APs (e.g., cooperating AP 'B' 508) based on observed conditions at the UE device 'x' 502. In other embodiments, the feedback message 1436 serves as an indication to serving and cooperating APs that the resource is still in use either for a HARQ retransmission or for a new packet transmission. In still further embodiments, the feedback message 1436 provides both functions of resource utilization and observed condition update. In some embodiments, cooperation for UE device 'x' 502 is continued at cooperating APs (e.g., cooperating AP 'B' 508) as long some feedback indication 1438 from the UE device 'x' 502 is received prior to each transmission. In still other embodiments, the cooperation for the UE device 'x' 502 is continued at cooperating APs (e.g., cooperating AP 'B' 508) based on the last feedback of cooperating information 1422 from the UE device 'x' 502 unless a feedback message is received to cancel the assignment reported by the UE device 'x' 502. In some embodiments, the feedback message indicates positive or negative acknowledgement of successful packet reception and decoding.

At some time $T_T+T_H$ 1640, the serving AP 'A' 506 transmits either a HARQ transmission of the packet, or a new packet transmission, to the UE device 'x' 502 on resource R, using feedback information optionally provided by the UE device 'x' 502. The other members of the cooperating set of APs (e.g., cooperating AP 'B' 508) also make transmissions 1444 to other UE devices (e.g., UE device 'y' 504), taking into account information transmitted by UE device 'x' 502 at time $T_2$ 1434 for cooperation. Assuming the packet is successfully received after two transmissions 1446, at some time $T_3$ 1448, the UE device 'x' 502 transmits a feedback message 1450 or other indication to the one or more cooperating APs (e.g., cooperating AP 'B' 508), including the serving AP 'A' 506 on the UL the packet has been successfully received, which may imply that that further HARQ transmissions of the packet are not needed and to begin a new packet transmission, if applicable. In some embodiments, cooperation for AP 'A' 506 is continued at cooperating APs (e.g., cooperating AP 'B' 508) as long some indication or observed feedback of conditions from the UE device 'x' 502 is received prior to each transmission. Accordingly, an indication or observed feedback of conditions at the UE device 'x' 502 is sent for the next packet transmission at this time.

In some embodiments, only a feedback message to the serving AP 'A' 506 is needed to signal the end of the packet HARQ transmissions, as other APs will continue to provide cooperation on the radio resource unless a feedback message is received to cancel the assignment reported by the UE device 'x' 502. In some embodiments, if there is another packet to transmit, then at some time $T_T+nT_H$ (e.g., $T_T+2T_H$ 1454), the serving AP 'A' 506 transmits a HARQ transmission of the packet, or possibly new packet transmission, to the UE device 'x' 502 on resource R using information provided by the UE device 'x' 502. The other members of the cooperating set of APs (e.g., cooperating AP 'B' 508) also make transmissions 1458 to other UE devices (e.g., UE device 'y' 504), taking into account channel and other information transmitted by UE device 'x' 502 at time $T_3$ 1448 for cooperation.

In some embodiments, several upcoming assignments or assignment maps may be sent in a single frame. For example, at time $T_t$, new assignments or the resource map may be sent for m subframes occurring sometime in the future. Accordingly, the assignment or resource maps are transmitted at intervals of m subframes. In some embodiments, the resource indication will be given in one subframe for several upcoming subframes.

Assuming the second packet is successfully received at the UE device 'x' 502 after this transmission 1460, the UE device 'x' 502 transmits a feedback message or other indication 1464 to at least the serving AP 'A' 506 on the UL that the packet has been successfully received. In some embodiments, feedback or indications are not sent to the other members of the cooperating set of APs and hence these AP's make transmissions 1462 to other UE devices (e.g., UE device 'y' 504) without consideration of transmission to UE 'x' 502 as cooperation requires per transmission feedback in certain embodiments. In certain other embodiments, the UE device 'x' 502 may end the continued cooperation by sending feedback or indications other members of the cooperating set of APs. In addition to the steps described above, in some embodiments the size and position of the resource are changed either through a request from the UE device 'x' 502 through UL feedback, or indicated by the AP at in a separate message. In the embodiment described where the cooperation is continued by other APs until a message is received from the UE device 'x' 502, the UE device 'x' 502 sends a feedback message to the cooperating APs indicating the changed resource allocation. In addition, to limit recovery time in the event of the ACK/NAK feedback error or loss of feedback from the UE device 'x' 502, the AP may provide a new packet indication whenever a new packet is transmitted in one of the $T_T+nT_H$ timeslots.

Although the described exemplary embodiments disclosed herein are described with reference to user-equipment-empowered radio resource management to mitigate interference between wireless access points, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A system for managing radio resources to mitigate interference between wireless access points, comprising:
   a first access point and a second access point, wherein the first and second access points are operable to communicate to a plurality of user equipment devices; the first access point using a first set of radio resources to enable a user equipment device of the plurality of user equipment devices to wirelessly communicate with the first access point;
   the second access point using a second set of radio resources to enable the user equipment device to wirelessly communicate with the second access point;
   the first set of radio resources to communicate cooperation data between the first access point and the user equipment device;
   the second set of radio resources to communicate cooperation data between the second access point and the user equipment device;
   the first access point communicates an indication of a set of available resources to the user equipment device;
   the user equipment device selects a radio resource assignment from the set of available resources, wherein the first set of radio resources is in accordance with the selected radio resource assignment; and the user equipment device communicates the selected radio resource assignment to the second access point for interference avoidance.

2. The system of claim 1, wherein the user equipment device communicates the selected radio resource assignment to the first access point.

3. The system of claim 2, wherein
   the cooperation data communicated to the first access point and the cooperation data communicated to the second access point each comprise radio channel condition data associated with the first and second sets of radio resources.

4. The system of claim 3, wherein
   the user equipment device communicates the radio resources assignment and the cooperation data to the second access point.

5. The system of claim 4, wherein
   the first access point communicates a confirmation of the radio resource assignment to the user equipment device prior to the user equipment device communicating the radio resource assignment to the second access point.

6. A method for managing radio resources to mitigate interference between wireless access points within a wireless network comprising a first access point and a second access point, the first and second access points being operable to communicate to a plurality of user equipment devices, the method comprising:
   enabling the first access point to use a first set of radio resources to enable a user equipment device to wirelessly communicate with the first access point;
   enabling the second access point to use a second set of radio resources to enable the user equipment device to wirelessly communicate with the second access point;
   communicating, via the first set of radio resources, cooperation data between the first access point and the user equipment device;

communicating, via the second set of radio resources, cooperation data between the second access point and the user equipment device;

communicating, via the first access point, an indication of available resources to of the user equipment device;

selecting a radio resource assignment from the set of available resources, wherein the first set of radio resources is in accordance with the selected radio resource assignment; and the user equipment device communicating the selected radio resource assignment to the second access point for interference avoidance.

7. The method of claim 6, wherein the user equipment device communicates the selected radio resource assignment to the first access point.

8. The method of claim 7, wherein the cooperation data communicated to the first access point comprises radio channel condition data associated with the first and second sets of radio resources and the cooperation data communicated to the second access point comprises radio channel condition data associated with the first and second sets of radio resources.

9. The method of claim 8, wherein the user equipment device communicates the radio resources assignment and cooperation data to the second access point.

10. The method of claim 9, wherein the first access point communicates a confirmation of the radio resource assignment to the user equipment device prior to the user equipment device communicating the radio resource assignment to the second access points.

11. The system of claim 1, wherein the second access point communicates a second indication of a set of second available resources to the user equipment device; and the user equipment device selects a second radio resource assignment from the set of second available resources, wherein the second set of radio resources is in accordance with the selected second radio resource assignment.

12. The system of claim 1, wherein the user equipment device establishes an indirect connection between the first and the second access points via the first and second sets of radio resources.

13. The method of claim 6, further comprising:

communicating, via the second access point, a second indication of a set of second available resources to the user equipment device; and selecting a second radio resource assignment from the set of second available resources, wherein the second set of radio resources is in accordance with the selected second radio resource assignment.

14. The method of claim 6, further comprising:

establishing, by the user equipment device, an indirect connection between the first and the second access points via the first and second sets of radio resources.

* * * * *

UNITED STATES PATENT AND TRADEMARK OFFICE
CERTIFICATE OF CORRECTION

| | | |
|---|---|---|
| PATENT NO. | : 9,072,106 B2 | Page 1 of 1 |
| APPLICATION NO. | : 13/696218 | |
| DATED | : June 30, 2015 | |
| INVENTOR(S) | : Robert Novak et al. | |

It is certified that error appears in the above-identified patent and that said Letters Patent is hereby corrected as shown below:

Claims

Claim 4, Column 42, Line 46 replace "resources" with --resource--

Claim 6, Column 43, Line 5 delete "of"

Signed and Sealed this
Twenty-sixth Day of January, 2016

Michelle K. Lee
*Director of the United States Patent and Trademark Office*